(12) United States Patent
Ray et al.

(10) Patent No.: US 12,374,101 B2
(45) Date of Patent: Jul. 29, 2025

(54) ERROR-BASED EXPLANATIONS FOR ARTIFICIAL INTELLIGENCE BEHAVIOR

(71) Applicant: SRI International, Menlo Park, CA (US)

(72) Inventors: Arijit Ray, Princeton, NJ (US); Michael A. Cogswell, West Windsor, NJ (US); Ajay Divakaran, Monmouth Junction, NJ (US); Yi Yao, Princeton, NJ (US); Giedrius T. Burachas, Princeton, NJ (US); Kamran Alipour, San Diego, CA (US)

(73) Assignee: SRI International, Menlo Park, CA (US)

( * ) Notice: Subject to any disclaimer, the term of this patent is extended or adjusted under 35 U.S.C. 154(b) by 577 days.

(21) Appl. No.: 17/656,391

(22) Filed: Mar. 24, 2022

(65) Prior Publication Data
US 2024/0005654 A1   Jan. 4, 2024

Related U.S. Application Data

(60) Provisional application No. 63/166,201, filed on Mar. 25, 2021.

(51) Int. Cl.
*G06V 10/70*   (2022.01)
*G06F 16/53*   (2019.01)
(Continued)

(52) U.S. Cl.
CPC ............ *G06V 10/98* (2022.01); *G06T 11/001* (2013.01); *G06V 10/7715* (2022.01); *G06V 10/776* (2022.01)

(58) Field of Classification Search
USPC ............... 128/920, 922–925; 382/103–133, 382/154–159; 706/1–62, 900–903
See application file for complete search history.

(56) References Cited

U.S. PATENT DOCUMENTS

| | | | |
|---|---|---|---|
| 8,213,709 B1 * | 7/2012 | Medasani | G06F 18/2178 382/155 |
| 10,909,401 B2 | 2/2021 | Burachas et al. | |

(Continued)

OTHER PUBLICATIONS

Ziaeefard Maryam; Method and Processing Device for Training a Neural Network; 2020 (Year: 2020).*

(Continued)

*Primary Examiner* — Marcellus J Augustin
(74) *Attorney, Agent, or Firm* — Shumaker & Sieffert, P.A.

(57) ABSTRACT

A computing system comprising a memory configured to store an artificial intelligence (AI) model and an image, and a computation engine executing one or more processors may be configured to perform the techniques for error-based explanations for AI behavior. The computation engine may execute the AI model to analyze the image to output a result. The AI model may, when analyzing the image to output the result, process, based on data indicative of the result, the image to assign an error score to each image feature extracted from the image, and obtain, based on the error scores, an error map. The AI model may next update, based on the error map and to obtain a first updated image, the image to visually indicate the error score assigned to each of the image features, and output one or more of the error scores, the error map, and the first updated image.

19 Claims, 6 Drawing Sheets

(51) Int. Cl.
 G06F 16/538 (2019.01)
 G06T 11/00 (2006.01)
 G06V 10/77 (2022.01)
 G06V 10/776 (2022.01)
 G06V 10/82 (2022.01)
 G06V 10/98 (2022.01)
 G06V 20/70 (2022.01)

(56) References Cited

U.S. PATENT DOCUMENTS

| | | | | |
|---|---|---|---|---|
| 12,067,794 | B2 * | 8/2024 | Kwon | G06V 10/764 |
| 2019/0370587 | A1 * | 12/2019 | Burachas | G06T 11/60 |
| 2020/0175377 | A1 * | 6/2020 | Iio | G06N 20/00 |
| 2021/0133485 | A1 * | 5/2021 | Kubota | G06F 18/214 |
| 2021/0232773 | A1 * | 7/2021 | Wang | G06F 18/21 |
| 2023/0206661 | A1 * | 6/2023 | Choi | H04N 5/265 |
| | | | | 382/156 |

OTHER PUBLICATIONS

Adadi et al., "Peeking Inside the Black-Box: A Survey on Explainable Artificial Intelligence (XAI)", Sep. 16, 2018, pp. 52138-52160.
Agrawal et al., "Analyzing the Behavior of Visual Question Answering Models", arXiv:1606.07356v2, Jun. 23, 2016, 13 pp.
Agrawal et al., "CloudCV: Large Scale Distributed Computer Vision as a Cloud Service", arXiv:1506.04130v3, Jun. 12, 2015, 26 pp.
Alipour et al., "The Impact of Explanations on AI Competency Prediction in VQA", IEEE, Sep. 21, 2020, 8 pp.
Anderson et al., "Bottom-Up and Top-Down Attention for Image Captioning and Visual Question Answering", IEEE, Mar. 14, 2018, pp. 6077-6086.
Antol et al., "VQA: Visual Question Answering", IEEE, May 3, 2015, pp. 2425-2433.
Bansal et al., "Towards Transparent Systems: Semantic Characterization of Failure Modes", vol. 8694, in European Conference on Computer Vision, 2014, p. 366-381., (Applicant points out, in accordance with MPEP 609.04(a), that the year of publication, 2014, is sufficiently earlier than the effective U.S. filing date, so that the particular month of publication is not an issue.).
Bazzani et al., "Self-Taught Object Localization with Deep Networks", IEEE, Mar. 7, 2016, 9 pp.
Bengio et al., "Representation Learning: A Review and New Perspectives", vol. 35, No. 8, IEEE Transactions on Pattern Analysis and Machine Intelligence, Apr. 23, 2014, pp. 1798-1828.
Cadene et al., "MUREL: Multimodal Relational Reasoning for Visual Question Answering", Conference on Computer Vision and Pattern Recognition (CVPR), Jun. 2019, pp. 1989-1998.
Chen et al., "Microsoft COCO Captions: Data Collection and Evaluation Server", arXiv:1504.00325v2, Jun. 1, 2015, 7 pp.
Chen et al., "Static correlative filter based convolutional neural network for visual question answering", IEEE, Jan. 15, 2018, pp. 526-529.
Cinbis et al., "Weakly Supervised Object Localization with Multifold Multiple Instance Learning", IEEE, Mar. 3, 2015, 15 pp.
Clark et al., "Simple and effective multi- paragraph reading comprehension", Proceedings of the 56th Annual Meeting of the Association for Computational Linguistics, Association for Computational Linguistics, Jul. 2018, pp. 845-855.
Clark et al., "What Does BERT Look At? An Analysis of BERT's Attention", arXiv:1906.04341v1, Jun. 11, 2019, 11 pp.
Conneau et al., "Supervised Learning of Universal Sentence Representations from Natural Language Inference Data", arXiv:1705.02364v5, Jun. 2016, 12 pp.
Das et al., "Human Attention in Visual Question Answering: Do Humans and Deep Networks Look at the Same Regions?", vol. 163, Elsevier, Jun. 2016, 23 pp.
De Marneffe et al., "Stanford typed dependencies manual", Sep. 2008, p. 28.

Deng et al., "ImageNet: A large-scale hierarchical image database", IEEE, Jun. 20, 2009, 8 pp.
Desta et al., "Object-Based Reasoning in VQA", 2018 IEEE Winter Conference on Applications of Computer Vision (WACV), IEEE, Jan. 29, 2018, pp. 1814-1823.
Devlin et al., "BERT: Pre-training of Deep Bidirectional Transformers for Language Understanding", arXiv:1810.04805v2, May 24, 2019, 16 pp.
Dosovitskiy et al., "Inverting Visual Representations with Convolutional Networks", CVPR, Jun. 9, 2015, pp. 4829-4837.
Dozat et al., "Deep Biaffine Attention for Neural Dependency Parsing", arXiv:1611.01734v3, Nov. 4, 2016, 8 pp.
Erhan et al., "Visualizing Higher-Layer Features of a Deep Network", Jun. 9, 2009, 12 pp.
Fang et al., "From Captions to Visual Concepts and Back", IEEE, Nov. 18, 2014, pp. 1473-1482.
Gan et al., "DevNet: A Deep Event Network for Multimedia Event Detection and Evidence Recounting", IEEE, Jun. 7, 2015, pp. 2568-2577.
Gao et al., "Are You Talking to a Machine? Dataset and Methods for Multilingual Image Question Answering", May 21, 2015, 9 pp.
Garcia et al., "KnowIT VQA: Answering knowledge-based questions about videos", arXiv:1910.10706v3, Oct. 23, 2019, 10 pp.
Gardner et al., "AllenNLP: A Deep Semantic Natural Language Processing Platform", arXiv:1803.07640v2, Mar. 20, 2018, 6 pp.
Girshick et al., "Detectron", facebookresearch / Detectron, Retrieved from:https://github.com/facebookresearch/detectron, Mar. 27, 2021, 5 pp.
Girshick et al., "Rich feature hierarchies for accurate object detection and semantic segmentation", IEEE, Nov. 11, 2013, 8 pp.
Gong et al., "Efficient training of BERT by progressively stacking", Proceedings of the 36th International Conference on Machine Learning, Proceedings of Machine Learning Research, May 24, 2019, pp. 2337-2346.
Gordon et al., "IQA: Visual Question Answering in Interactive Environments", IEEE, Dec. 9, 2017, 10 pp.
Goyal et al., "Making the V in VQA Matter: Elevating the Role of Image Understanding in Visual Question Answering", IEEE, Dec. 2, 2016, pp. 6904-6913.
Gunning et al., "DARPA's Explainable Artificial Intelligence Program", vol. 40, No. 2, AI Magazine, 2019, p. 44-58, (Applicant points out, in accordance with MPEP 609.04(a), that the year of publication, 2019, is sufficiently earlier than the effective U.S. filing date, so that the particular month of publication is not an issue.).
Gurari et al., "VizWiz Grand Challenge: Answering Visual Questions from Blind People", IEEE, Feb. 22, 2018, 13 pp.
He et al., "Deep Residual Learning for Image Recognition", arXiv:1512.03385v1, Dec. 10, 2015, 12 pp.
Hendricks et al., "Generating Visual Explanations", vol. 9908, in European Conference on Computer Vision, 2016, pp. 3-19, (Applicant points out, in accordance with MPEP 609.04(a), that the year of publication, 2016, is sufficiently earlier than the effective U.S. filing date, so that the particular month of publication is not an issue.).
Hochreiter et al., "Long Short-Term Memory", vol. 9, No. 8, Neural Computation, Nov. 15, 1997, pp. 1735-1780.
Hoiem et al., "Diagnosing Error in Object Detectors", European conference on computer vision, ECCV, Oct. 7, 2012, pp. 340-353.
Hudson et al., "Learning by abstraction: The neural state machine", 33rd Conference on Neural Information Processing Systems (NeurIPS 2019), Jul. 9, 2019, 17 pp.
Jia et al., "Caffe: Convolutional Architecture for Fast Feature Embedding", arXiv:1408.5093v1, Jun. 20, 2014, 4 pp.
Jiang et al., "Pythia v0.1: the Winning Entry to the VQA Challenge 2018", arXiv:1807.09956v2, Jul. 26, 2018, 3 pp.
Johns et al., "Becoming the Expert—Interactive Multi-Class Machine Teaching", IEEE, Apr. 28, 2015, pp. 2616-2624.
Johnson et al., "DenseCap: Fully Convolutional Localization Networks for Dense Captioning", IEEE, Nov. 24, 2015, pp. 4565-4574.
Johnson et al., "Image Retrieval using Scene Graphs", IEEE, Jun. 7, 2015, pp. 3668-3678.
Karpathy et al., "Deep Visual-Semantic Alignments for Generating Image Descriptions", IEEE, Dec. 6, 2014, pp. 3128-3167.

(56) References Cited

OTHER PUBLICATIONS

Karpathy et al., "What I learned from competing against a ConvNet on ImageNet", Sep. 2, 2014, 8 pp.
Kazemzadeh et al., "ReferItGame: Referring to Objects in Photographs of Natural Scenes", Proceedings of the 2014 conference on empirical methods in natural language processing (EMNLP), Oct. 1, 2014, pp. 787-798.
Kim et al., "Bilinear Attention Networks", 32nd Conference on Neural Information Processing Systems (NeuriPS 2018), May 21, 2018, 11 pp.
Kim et al., "DeepStory: Video Story QA by Deep Embedded Memory Networks", ArXiv, Jul. 4, 2017, 7 pp.
Kim et al., "Multi-modal dual attention memory for video story question answering", arXiv:1809.07999v1, Sep. 8, 2018, 16 pp.
Kim et al., "Progressive attention memory network for movie story question answering", IEEE, Apr. 18, 2019, 10 pp.
Kingma et al., "Adam: a Method for Stochastic Optimization", arXiv:1412.6980v9, Dec. 22, 2014, 15 pp.
Kiros et al., "Skip-thought vectors", arXiv:1506.06726v1, Jun. 22, 2015, 11 pp.
Krishna et al., "Dense-captioning events in videos", IEEE, May 2, 2017, 16 pp.
Krishna et al., "Visual Genome: Connecting Language and Vision Using Crowdsourced Dense Image Annotations", International Journal of Computer Vision, Feb. 23, 2016, pp. 32-73.
Krizhevsky et al., "ImageNet Classification with Deep Convolutional Neural Networks", Dec. 3, 2012, 9 pp.
Lei et al., "TVQA+: Spatio-Temporal Grounding for Video Question Answering", arXiv:1904.11574v2, Apr. 25, 2019, 15 pp.
Lei et al., "TVQA: Localized, Compositional Video Question Answering", arXiv:1809.01696v2, Sep. 5, 2018, 13 pp.
Li et al., "Relation-aware graph attention network for visual question answering", arXiv:1903.12314v3, Mar. 29, 2019, 10 pp.
Li et al., "Story Ending Prediction by Transferable BERT", arXiv:1905.07504v2, May 17, 2019, 7 pp.
Li et al., "Tell-and-answer: Towards explainable visual question answering using attributes and captions", Proceedings of the 2018 Conference on Empirical Methods in Natural Language Processing, Association for Computational Linguistics, Jan. 27, 2018, pp. 1338-1346.
Li et al., "Visualbert: a Simple and Performant Baseline for Vision and Language", arXiv:1908.03557v1, Aug. 9, 2019, 14 pp.
Lin et al., "Microsoft COCO: Common objects in context", arXiv:1405.0312v3, May 1, 2014, 15 pp.
Lin et al., "Network in network", Dec. 16, 2013, 10 pp.
Lipton, "The Mythos of Model Interpretability", arXiv:1606.03490v1, Jun. 10, 2016, pp. 96-100.
Liu et al., "Multimodal cross-guided attention networks for visual question answering", Advances in Intelligent Systems Research (AISR), vol. 151, Atlantis Press, Apr. 1, 2018, pp. 347-353.
Long et al., "Fully Convolutional Networks for Semantic Segmentation", IEEE, Nov. 14, 2014, pp. 3431-3440.
Lu et al., "Deeper LSTM+ normalized CNN for Visual Question Answering", GT-Vision-Lab / VQA_LSTM_CNN, Retrieved from: GT-Vision-Lab / VQA_LSTM_CNN, Jun. 14, 2016, 5 pp.
Lu et al., "Hierarchical Question-Image Co-Attention for Visual Question Answering", 30th Conference on Neural Information Processing Systems (NIPS 2016), May 31, 2016, 9 pp.
Lu et al., "R-VQA: Learning Visual Relation Facts with Semantic Attention for Visual Question Answering", arXiv:1805.09701v2, May 24, 2018, 10 pp.
Lu et al., "ViLBERT: Pretraining Task-Agnostic Visiolinguistic Representations for Vision-and-Language Tasks", 33th Conference on Neural Information Processing Systems (NIPS 2019), Aug. 6, 2019, 11 pp.
Mahendran et al., "Salient deconvolutional networks", European Conference on Computer Vision, Oct. 11, 2016, pp. 120-135.
Mahendran et al., "Visualizing deep convolutional neural networks using natural pre-images", arXiv:1512.02017v3, Apr. 15, 2016, 25 pp.
Malinowski et al., "Ask Your Neurons: A Neural-based Approach to Answering Questions about Images", IEEE, May 5, 2015, 9 pp.
McCann et al., "Learned in Translation: Contextualized Word Vectors", 31st Conference on Neural Information Processing Systems (NIPS 2017), Aug. 1, 2017, 12 pp.
Mun et al., "MarioQA: Answering Questions by Watching Gameplay Videos", IEEE, Dec. 6, 2016, 9 pp.
Narasimhan et al., "Out of the Box: Reasoning with Graph Convolution Nets for Factual Visual Question Answering", 32nd Conference on Neural Information Processing Systems (NIPS 2018), Nov. 1, 2018, 12 pp.
Narasimhan et al., "Straight to the facts: Learning knowledge base retrieval for factual visual question answering", arXiv:1809.01124v1, Sep. 4, 2018, 18 pp.
Norcliffe-Brown et al., "Learning Conditioned Graph Structures for Interpretable Visual Question Answering", 32nd Conference on Neural Information Processing Systems (NIPS 2018), Jun. 1, 2018, 13 pp.
Oquab et al., "Is object localization for free?—Weakly-supervised learning with convolutional neural networks", Proceedings of the IEEE conference on computer vision and pattern recognition, IEEE, Jun. 7, 2015, pp. 685-694.
Oquab et al., "Learning and Transferring Mid-Level Image Representations using Convolutional Neural Networks", Proceedings of the IEEE conference on computer vision and pattern recognition, IEEE, Jun. 23, 2014, pp. 1717-1724.
Patro et al., "U-CAM: Visual Explanation Using Uncertainty Based Class Activation Maps", IEEE, 2019, p. 7444-7453, (Applicant points out, in accordance with MPEP 609.04(a), that the year of publication, 2019, is sufficiently earlier than the effective U.S. filing date, so that the particular month of publication is not an issue.).
Pennington et al., "GloVe: Global Vectors for Word Representation", Proceedings of the 2014 Conference on Empirical Methods in Natural Language Processing (EMNLP), Association for Computational Linguistics, Oct. 25, 2014, pp. 1532-1543.
Peters et al., "Deep contextualized word representations.", arXiv:1802.05365v2, Feb. 15, 2018, 15 pp.
Petsiuk et al., "RISE: Randomized Input Sampling for Explanation of Black-box Models", arXiv preprint arXiv:1806.07421, Sep. 25, 2018, 13 pp.
Pinheiro et al., "From Image-level to Pixel-level Labeling with Convolutional Networks", IEEE, Nov. 23, 2014, pp. 1713-1721.
Plummer et al., "Flickr30k Entities: Collecting Region-to-Phrase Correspondences for Richer Image-to-Sentence Models", Proceedings of the IEEE international conference on computer vision, May 19, 2015, pp. 2641-2649.
Radford et al., "Improving language understanding by generative pre-training", OpenAI blog, Jun. 11, 2018, 12 pp.
Radford et al., "Language models are unsupervised multitask learners", OpenAI blog, Feb. 14, 2019, 24 pp.
Ren et al., "Exploring Models and Data for Image Question Answering", Advances in Neural Information Processing Systems 28 (NIPS 2015), May 8, 2015, 9 pp.
Ren et al., "Faster R-CNN: Towards real-time object detection with region proposal networks", IEEE, Jun. 4, 2015, 10 pp.
Ribeiro et al., ""Why Should I Trust You?" Explaining the Predictions of Any Classifier", Proceedings of the 22nd Acm Sigkdd international conference on knowledge discovery and data mining, ACM, Feb. 16, 2016, pp. 1135-1144.
Russakovsky et al., "ImageNet Large Scale Visual Recognition Challenge", International Journal of Computer Vision, vol. 115, No. 3, Springer, Apr. 2015, pp. 211-252.
Ruwa et al., "Mood-aware visual question answering", ScienceDirect, Feb. 22, 2019, pp. 305-316.
Santoro et al., "A simple neural network module for relational reasoning", arXiv:1706.01427v1, Jun. 5, 2017, 16 pp.
Selvaraju et al., "Grad-CAM: Visual Explanations from Deep Networks via Gradient-based Localizations", IEEE, Oct. 7, 2017, pp. 618-626.
Selvaraju et al., "Grad-CAM: Why did you say that?", arXiv:1611.07450v2, Nov. 22, 2016, 4 pp.
Sharma et al., "Conceptual Captions: A Cleaned, Hypernymed, Image Alt-text Dataset for Automatic Image Captioning", Proceed-

(56) References Cited

OTHER PUBLICATIONS ings of the 56th Annual Meeting of the Association for Computational Linguistics (Long Papers), Jul. 15, 2018, p. 2556-2565.
Silver et al., "Mastering the game of Go with deep neural networks and tree search", Nature, vol. 529, No. 7587, Macmillan Publisher Limited, Jan. 28, 2016, pp. 484-489.
Simonyan et al., "Deep Inside Convolutional Networks: Visualising Image Classification Models and Saliency Maps", arXiv:1312.6034v2, Dec. 20, 2013, 8 pp.
Simonyan et al., "Very Deep Convolutional Networks for Large-Scale Image Recognition", ICLR, Sep. 4, 2014, 14 pp.
Singh et al., "Pythia—A platform for vision & language research", Computer Science, 2018, 4 pp., (Applicant points out, in accordance with MPEP 609.04(a), that the year of publication, 2018, is sufficiently earlier than the effective U.S. filing date, so that the particular month of publication is not an issue.).
Singh et al., "Towards VQA models that can read", Proceedings of the IEEE/CVF conference on computer vision and pattern recognition, IEEE, Apr. 18, 2019, pp. 8317-8326.
Socher et al., "Recursive Deep Models for Semantic Compositionality Over a Sentiment Treebank", Proceedings of the 2013 Conference on Empirical Methods in Natural Language Processing, Association for Computational Linguistics, Oct. 1, 2013, pp. 1631-1642.
Springenberg et al., "Striving for Simplicity: the All Convolutional Net", ICLR, Dec. 21, 2014, 14 pp.
Suhr et al., "A corpus for reasoning about natural language grounded in photographs", Nov. 1, 2018, 11 pp.
Sun et al., "VideoBert: A joint model for video and language representation learning", IEEE, Apr. 3, 2019, 13 pp.
Tapaswi et al., "MovieQA: Understanding Stories in Movies through Question-Answering", IEEE, Dec. 9, 2015, 10 pp.
Turian et al., "Word Representations: A Simple and General Method for Semi-Supervised Learning", Proceedings of the 48th Annual Meeting of the Association for Computational Linguistics, Association for Computational Linguistics, Jul. 11, 2010, pp. 384-394.
Vaswani et al., "Attention is all you need", 31st Conference on Neural Information Processing Systems (NIPS 2017), Jun. 12, 2017, 15 pp.
Mnyals et al., "Show and Tell: A Neural Image Caption Generator", Proceedings of the IEEE conference on computer vision and pattern recognition, IEEE, Nov. 17, 2014, pp. 3156-3164.
Voita et al., "Analyzing Multi-Head Self-Attention: Specialized Heads Do the Heavy Lifting, the Rest Can Be Pruned", arXiv:1905.09418v2, May 23, 2019, 12 pp.
Vondrick et al., "HOGgles: Visualizing Object Detection Features", IEEE, Dec. 1, 2013, 8 pp.
Wu et al., "A Robust Passage Retrieval Algorithm for Video Question Answering", IEEE Transactions on Circuits and Systems for Video Technology, vol. 18, No. 10, IEEE, Oct. 1, 2008, pp. 1411-1421.
Wu et al., "CLVQ: cross-language video question/answering system", Proceedings of the IEEE Sixth International Symposium on Multimedia Software Engineering (ISMSE'04), IEEE, Dec. 13, 2004, 9 pp.
Wu et al., "Google's Neural Machine Translation System: Bridging the Gap between Human and Machine Translation", arXiv:1609.08144v2, Sep. 26, 2016, 23 pp.
Xu et al., "Ask, attend and answer: Exploring question-guided spatial attention for visual question answering", arXiv:1511.05234v2, Nov. 17, 2015, 16 pp.
Xu et al., "Show, attend and tell: Neural image caption generation with visual attention", arXiv:1502.03044v3, Feb. 10, 2015, 22 pp.
Yang et al., "BERT Representations for Video Question Answering", Proceedings of the IEEE/CVF Winter Conference on Applications of Computer Vision, IEEE, Mar. 1, 2020, pp. 1556-1565.
Yang et al., "Stacked attention networks for image question answering", IEEE, Nov. 7, 2015, 11 pp.
Yang et al., "XLNet: Generalized Autoregressive Pretraining for Language Understanding", 33rd Conference on Neural Information Processing Systems (NeurIPS 2019), Jun. 19, 2019, 18 pp.
Yin et al., "Obj2Text: Generating Visually Descriptive Language from Object Layouts", arXiv:1707.07102v1, Jul. 22, 2017, 11 pp.
Yu et al., "Deep modular co-attention networks for visual question answering", IEEE, Jun. 1, 2019, 11 pp.
Yu et al., "Multimodal transformer with multi-view visual representation for image captioning", Journal of Latex Class Files, vol. 14, No. 8, IEEE, Aug. 2015, 12 pp.
Yu et al., "Structured semantic representation for visual question answering", IEEE, Oct. 1, 2018, p. 2286-2290.
Zeiler et al., "Visualizing and Understanding Convolutional Networks", European conference on computer vision, Springer International Publishing, Nov. 12, 2013, pp. 818-833.
Zellers et al., "From recognition to cognition: Visual commonsense reasoning", IEEE, Nov. 27, 2018, 29 pp.
Zeng et al., "Leveraging video descriptions to learn video question answering", Thirty-First AAAI Conference on Artificial Intelligence, Feb. 12, 2017, 7 pp.
Zhang et al., "Top-Down Neural Attention by Excitation Backprop", Springer International Publishing, Aug. 1, 2016, pp. 543-559.
Zhao et al., "Multi-turn video question answering via multi-stream hierarchical attention context Network", Proceedings of the Twenty-Seventh International Conference on Artificial Intelligence (IJCAI-18), Jul. 13, 2018, p. 3690-3696.
Zhou et al., "Learning Deep Features for Discriminative Localization", Proceedings of the IEEE conference on computer vision and pattern recognition, IEEE, Dec. 14, 2015, pp. 2921-2929.
Zhu et al., "Uncovering the temporal context for video question answering", arXiv:1511.04670v1, Sep. 1, 2017, 10 pp.

* cited by examiner

Is this a double decker bus?
VQA: Yes, GT: Yes

Attention Regions: 310B  Error Regions: 310A

Helpful – Error is NOT aligned with attention. Hence, model is correct.

Would it be easy to steal this motorcycle?
VQA: Yes, GT: No

Attention Regions: 300B  Error Regions: 300A

Helpful – Error is aligned with attention. Hence, model is wrong.

ERROR-BASED EXPLANATIONS FOR ARTIFICIAL INTELLIGENCE BEHAVIOR

This application claims the benefit of U.S. Provisional Application No. 63/166,201, filed Mar. 25, 2021, the entire contents of which is hereby incorporated by reference.

GOVERNMENT RIGHTS

This invention was made with Government support under contract no. FA8750-17-C-0115 awarded by the Air Force Research Laboratory and the Defense Advanced Research Projects Agency. The Government has certain rights in this invention.

TECHNICAL FIELD

This disclosure is related to artificial intelligence.

BACKGROUND

Artificial intelligence (AI), in some instances, can be used as a way by which a computing device operates to predict an output either responsive to inputs or automatically generated, where simple logic is not sufficient. AI models may utilize machine learning (ML), which typically involves training an AI model with training data to produce a trained model able to generalize properties of data based on similar patterns with the training data. Training the model may involve learning model parameters by optimizing an objective function, thus optimizing a likelihood of observing the training data given the model. Given variabilities in the training data, the extent of training samples within the training data, and other limitations to training, and the complexity of modern AI models, it is often difficult to explain certain results that appear erratic or fail to meet expectations.

SUMMARY

In general, the disclosure describes various aspects of techniques for facilitating evaluation of results produced by artificial intelligence. More specifically, various aspects of the techniques described in this disclosure may enable error-based explanations for artificial intelligence (AI) behavior (such as visual question answering (VQA) model behavior). Rather than simply providing an answer (in the example context of a VQA model), the VQA model may also identify which parts of an image were difficult for the VQA model to analyze (e.g., the parts of the image toward which the "attention" of the VQA model was erroneously drawn) in order to provide the answer, thereby potentially providing an error-based explanation that enables a user of the VQA model to evaluate a reason for the answer to assess confidence in the VQA model or otherwise gain a better understanding of limitations of the VQA model.

In addition, various aspects of the techniques may enable the VQA model to synthesize the error map with a so-called attention map in order to obtain a helpfulness metric. The VQA model may generate the attention map as a function of attention scores identified while processing the input image. The VQA model may overlay the attention map on the image to produce an attention map image that may identify which portions (e.g., image features) the VQA model identified as relevant in producing the answer. VQA model may also output this helpfulness metric to facilitate user understanding of how the VQA model reached the answer. As the VQA model produces this helpfulness metric in part based on the error map, the helpfulness metric may provide an additional form of error-based explanation.

In this respect, various aspects of the techniques may provide various benefits that improve operation of the VQA model. For example, by outputting the error-based explanation along with the answer, the VQA model may better explain how the answer to a given inquiry was determined, thereby providing a more comprehensive and/or informative user experience that facilitates user trust and understanding of the VQA model. Further, by revealing limitations in the form of an error map (which is one example of a form of error-based explanation), the VQA model may delineate where further training may be useful to improve operation of the VQA model itself (where, in some instances, the VQA model may automatically perform unguided training responsive to user feedback indicating a given answer is unsupported by the error-based explanation).

In one example, various aspects of the techniques are directed to a computing system comprising: a memory configured to store an artificial intelligence model and the image; and a computation engine executing one or more processors, wherein the computation engine is configured to execute the artificial intelligence model to analyze the image to output a result, wherein the artificial intelligence model is configured to, when analyzing the image to output the result: process, based on data indicative of the result, the image to assign an error score to each of one or more image features extracted from the image, each of the error scores indicative of a likelihood the artificial intelligence model having difficulty in analyzing the corresponding image feature extracted from the image; obtain, based on the error scores, an error map; update, based on the error map and to obtain a first updated image, the image to visually indicate the error score assigned to each of the one or more image features; and output one or more of the error scores, the error map, and the first updated image.

In another example, various aspects of the techniques are directed to a method of explaining a result output by an artificial intelligence model configured to analyze an image, the method comprising: executing, by a computing system, the artificial intelligence model to analyze the image in order to output a result, wherein analyzing, by the artificial intelligence model, the image to output the result comprises: processing, based on data indicative of the result, the image to assign an error score to each of one or more image features extracted from the image, each of the error scores indicative of the artificial intelligence model having difficulty in analyzing the corresponding image feature extracted from the image; obtaining, based on the error scores, an error map; updating, based on the error map and to obtain a first updated image, the image to visually indicate the error score assigned to each of the one or more image features; and outputting one or more of the error scores, the error map, and the first updated image.

In another example, various aspects of the techniques are directed to a device configured to explain a result output by an artificial intelligence model configured to analyze an image, the device comprising: a memory configured to store the artificial intelligence model and the image; and a computation engine executing one or more processors, wherein the computation engine is configured to execute the artificial intelligence model to analyze the image in order to output a result, wherein the artificial intelligence model is configured to, when analyzing the image to output the result: process the image to extract one or more image features; determine an error map for the image in which corresponding error scores are assigned to one or more of the image features; determine an attention map for the image in which corresponding attention scores are assigned to one or more of the image features; determine, based on the error map and the attention map, a helpfulness metric that identifies a relevance of the attention map in explaining the result output by the artificial intelligence model; and output one or more of the error scores, the error map, the attention scores, the attention map, and the helpfulness metric.

In another example, various aspects of the techniques are directed to a method of explaining a result output by an artificial intelligence model configured to analyze an image, the method comprising: receiving, by a computing system, a query regarding the image; and executing, by the computing system, the artificial intelligence model to analyze the image in order to output the result to the query, wherein analyzing, by the artificial intelligence model, the image to output the result: determining, based on the query, an error map for the image in which an error score is assigned to one or more image features extracted from the image; determining, based on the query, an attention map for the image in which an attention score is assigned to one or more of each of the image features; determining, based on the error map and the attention map, a helpfulness metric that identifies a relevance of the attention map in explaining the result output by the artificial intelligence model; and outputting the helpfulness metric.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
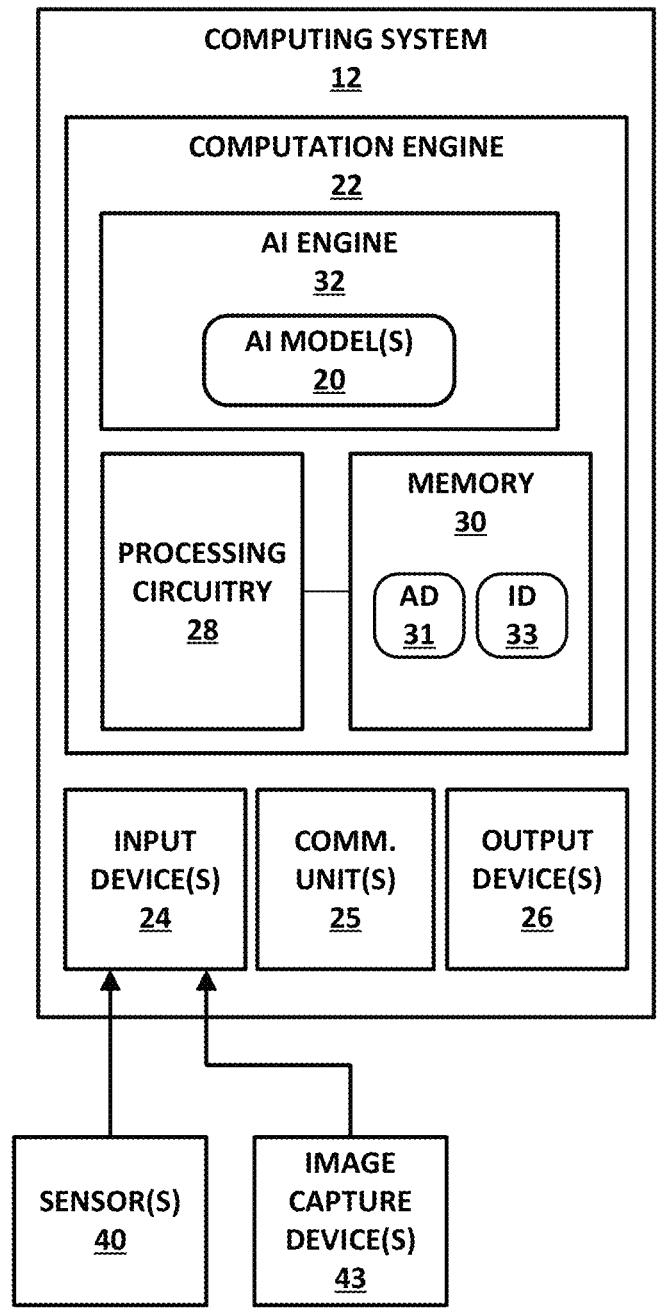
FIGS. 1A and 1B are examples of different computing architectures that may be configured to perform various aspects of the explanation techniques described in this disclosure.

Machine learning may generally enable a computing system to analyze input data and identify an action to be performed or predict an output responsive to the input data (such as providing a given answer). Each machine learning model may be trained using training data that reflects likely input data. The training data may be labeled or unlabeled (meaning that the correct action to be taken based on a sample of training data is explicitly stated or not explicitly stated, respectively). The training of the machine learning model may be guided (in that a designer, such as a computer programmer, may direct the training to guide the machine learning model to identify the correct action in view of the input data) or unguided (in that the machine learning model is not guided by a designer to identify the correct action in view of the input data). In some instances, the machine learning model is trained through a combination of labeled and unlabeled training data, a combination of guided and unguided training, or possibly combinations thereof.

Even when the machine learning model undergoes guided training with labeled training data (which may represent what might be considered the most directed training that should result in more expected actions compared to unguided training using unlabeled training data or various combinations thereof), there are limits to training the machine learning model as such training is not often exhaustive (in terms of fully sampling each feature of the space defined by the input data). In other words, there may be limited training data that may not fully address the wider variability of the input data.

Further, a potential benefit of machine learning models is to avoid exhaustive and time-consuming comprehensive training but still produce a machine learning model that performs accurate action identification (which is another way of referring to a "decision") through limited sampled training. As such, the resulting machine learning module may operate erratically (selecting surprising or unforeseen actions) in the context of certain (possibly unforeseen or unlikely) input data for which there were only limited (or no) samples in the training data or for which training was not fully performed.

Given the complexity of the machine learning model, it may be difficult to explain in detail a basis upon which the machine learning model identified the various results, particularly when such actions appear to be erratic or unexpected. To illustrate, consider an example of a machine learning model that implements a deep neural network, which may include three or more layers of neural networks, and which is trained using training data to identify an action. Attempting to explain how each neural network layer of the deep neural network weighed each aspect of the input data to identify what may be considered an erratic action may entail significant analysis and understanding of the training data, the input data, or combinations thereof.

As another example, consider a virtual question answering (VQA) model that includes one or more machine learning algorithms configured to support different aspects of the VQA model. Generally, the VQA model may receive as inputs an image and a query regarding the image (typically in the form of audio data representative of speech defining the query). The VQA model may include a bidirectional encoder representations from transformations (BERT) model to encode the query and the image into respective query features and image features coupled with a convolutional neural network (CNN) to process the query features and the image features to identify a result (or, in other words, an answer). The VQA model may process the query features (which may also be referred to as keywords) relative to the image features to identify an answer to the query. The complexity of the CNN (and to a lesser degree the BERT model) and how each layer of the CNN weights each of the image features may be considered an erratic action that may entail significant analysis and understanding of the training data, the input data (both the audio data and the image), or combinations thereof.

That is, machine learning-based systems (which is another way of referring to an artificial intelligence model) may be considered to largely operate as a black box with little visibility into causes for operational outcomes output by the machine learning-based systems. Such operational outcomes may refer to diagnostic/prognostic decision in data analytics, control decision in autonomous systems and other predictive inferences or, in other words, results produced by such machine learning-based systems. Consider a so-called black-box machine learning system deployed in a car parts factory for product quality assurance by way of visual camera inspection. In this example system, an engineer may encounter a problem of certain products on the assembly line being classified as defective. The block-box machine learning system may not, however, provide evidence used in such decision. Likewise, some of the analyzed parts may be classified as acceptable by the black-box machine learning system, even though an engineer notices suspicious features and would like to inspect decision making processes of the black-box machine learning system.

Various aspects of the techniques described in this disclosure facilitate the explanation of artificial intelligence that operate according to machine learning models. The techniques may enable a computing system to provide one or more of error-based explanations, attention-based explanations, or a hybrid explanation that combines error-based explanations with attention-based explanations (which may be referred to as a helpfulness metric) for artificial intelligence behavior (such as visual question answering (VQA) behavior). Rather than simply provide an answer (in the example context of a VQA model), the VQA model may also identify which aspects of an underlying image were difficult to analyze (e.g., in error-based explanations), which aspects of the underlying image were relied upon to reach the answer (e.g., in attention-based explanations), or a combination of which aspects of the underlying image were both difficult to analyze and correctly relied upon to reach the answer.

In this manner, various aspects of the techniques potentially provide one or more of an error-based explanation, an attention-based explanation, and/or a helpfulness explanation. In each instance, various aspects of the techniques may enable a user of the VQA model to evaluate a reason for the answer to assess confidence in the model or otherwise gain a better understanding of limitations of the VQA model.

In this respect, various aspects of the techniques may provide various benefits that improve operation of the VQA model itself. For example, by outputting the error-based explanation along with the answer, the VQA model may better explain how the VQA model had difficulty generating the answer to provide a more comprehensive user experience that facilitates user trust and understanding of the VQA model. Further, by revealing such limitations, the VQA model may delineate where further training may be useful to improve operation of the VQA model itself. This may be particularly useful where, in some instances, the VQA model may automatically perform unguided training responsive to user feedback indicating a given answer is unsupported by the attention-based explanation.

In the car parts assembly example above, to provide a better context in which to assess the benefits, the various aspects of the techniques may provide an analytic explanation that potentially identifies features and/or components of the parts that form a basis for a faulty operation outcome output by the black-box machine learning system. Another use scenario may involve a physician assistant tasked with running a machine learning system for diagnosing medical conditions of a patient vital organs based on medical imaging data, e.g., a magnetic resonance imaging (MRI) image. The machine learning system may classify the image as normal, abnormal, and/or pathological. Counterintuitive or high-risk classification results would naturally cause a desire on the part of the user to understand the decision path that the system takes in order to produce the results.

Figure 1B:
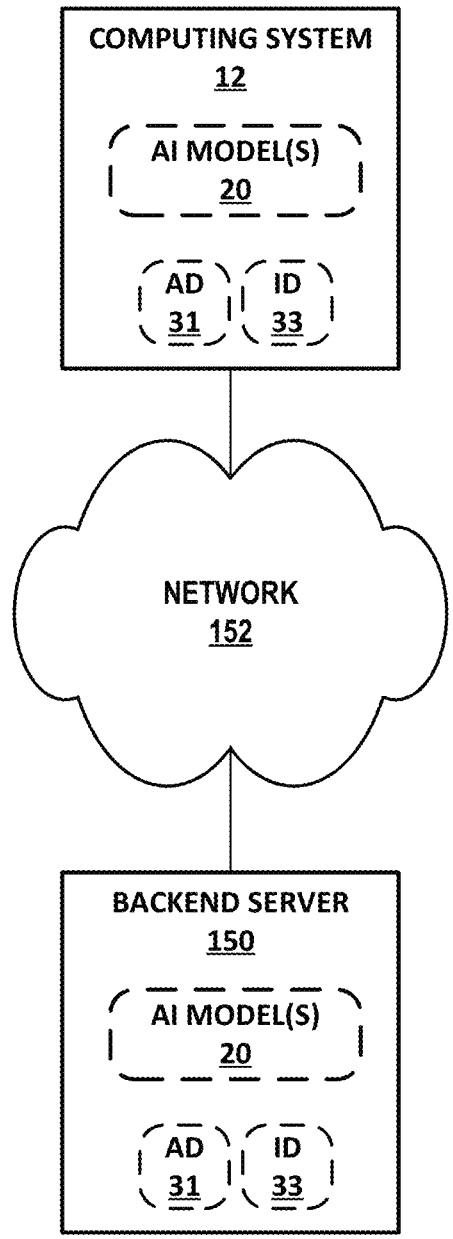

FIGS. 1A and 1B are examples of different computing architectures that may be configured to perform various aspects of the explanation techniques described in this disclosure. As shown in the example of FIG. 1A, a single computing system 12 may be configured to perform various aspects of the techniques described in this disclosure. Computing system 12 includes a computation engine 22, one or more input devices 24, one or more communication devices 25, and one or more output devices 26. Computation engine 22 may include processing circuitry 28 and a memory 30.

Memory 30 may store information for processing during operation of computation engine 22. In some examples, memory 30 may include temporary memories, meaning that a primary purpose of the one or more storage devices is not long-term storage. Memory 30 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Computing system 12 may be implemented as any suitable computing system, such as one or more server computers, workstations, laptops, mainframes, appliances, cloud computing systems, smart phones, tablet computers, and/or other computing systems that may be capable of performing operations and/or functions described in accordance with one or more aspects of the present disclosure. In some examples, computing system 12 may represent a cloud computing system, server farm, and/or server cluster (or portion thereof) that provides services to client devices and other devices or systems. In other examples, computing system 12 may represent or be implemented through one or more virtualized compute instances (e.g., virtual machines, containers, etc.) of a data center, cloud computing system, server farm, and/or server cluster.

Memory 30, in some examples, also include one or more computer-readable storage media (which may also be referred to as "non-transitory computer-readable media" or "non-transitory computer-readable storage media"). The computer-readable storage media may be configured to store larger amounts of information than volatile memory. The computer-readable storage media may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Whether representative of volatile or non-volatile memory, memory 30 may store program instructions and/or data associated with one or more of the modules, units, and/or engines described in accordance with one or more aspects of this disclosure.

Processing circuitry 28 and memory 30 may provide an operating environment or platform for computation engine 22, which may be implemented as software, but may in some examples include any combination of hardware, firmware, and software. Processing circuitry 28 may execute instructions and memory 30 may store instructions and/or data of one or more modules, units, and/or engines. The combination of processing circuitry 28 and memory 30 may retrieve, store, and/or execute the instructions and/or data of one or more applications, modules, units, engines, and/or software. Processing circuitry 28 and memory 30 may also be operably coupled to one or more other software and/or hardware components, including, but not limited to, one or more of the components illustrated in FIG. 1A.

Computation engine 22 may perform operations described using software, hardware, firmware, or a mixture of hardware, software, and firmware residing in and/or executing at computing system 12. Computation engine 22 may execute each of the module(s), unit(s), and/or engine(s) with multiple processors or multiple devices. Computation engine 22 may execute one or more of such modules as a virtual machine or container executing on underlying hardware. One or more of such modules may execute as one or more services of an operating system or computing platform. One or more of such modules may execute as one or more executable programs at an application layer of a computing platform.

One or more input devices 24 of computing system 12 may generate, receive, or process input. Such input may include input from a keyboard, pointing device, voice responsive system, video camera (which may also function to capture still images), biometric detection/response system, button, sensor, mobile device, control pad, microphone, presence-sensitive screen, network, or any other type of device for detecting input from a human or machine.

One or more output devices 26 of computing system 12 may generate, transmit, or process output. Examples of output are tactile, audio, visual, and/or video output. Output devices 26 may include a display, sound card, video graphics adapter card, speaker, presence-sensitive screen, one or more USB interfaces, video and/or audio output interfaces, or any other type of device capable of generating tactile, audio, video, or other output. Output devices 26 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, computing system 12 may include a presence-sensitive display that may serve as a user interface device that operates both as one or more input devices 24 and one or more output devices 26.

One or more communication units 25 of computing system 12 may communicate with devices external to computing system 12 (or among separate computing devices of computing system 12) by transmitting and/or receiving data, and may operate, in some respects, as both an input device and an output device. In some examples, communication units 25 may communicate with other devices over a network. In other examples, communication units 25 may send and/or receive radio signals on a radio network such as a cellular radio network. Examples of communication units 25 include a network interface card (e.g. such as an Ethernet card), an optical transceiver, a radio frequency transceiver, a GPS receiver, or any other type of device that can send and/or receive information. Other examples of communication units 25 may include Bluetooth®, GPS, 3G, 4G, and Wi-Fi® radios found in mobile devices as well as Universal Serial Bus (USB) controllers and the like.

As further shown in the example of FIG. 1A, input devices 24 are configured to receive electrical signal input from one or more sensors, such as sensor(s) 40 and image capture device(s) 43 and convert the electrical signal input into a form usable by computing system 12. Sensors 40 may represent a wide variety of sensors configured to obtain data representative of an observational state of an environment, such as an environment surrounding computing system 12.

Sensors 40 may include, in some examples, one or more of a GPS sensor configured to obtain location state data indicative of a location of computing system 12, a gyroscope sensor configured to obtain orientation and velocity data indicative of an orientation and/or angular velocity of computing system 12, a proximity sensor configured to obtain proximity data indicative of a proximity of the computing system 12 to an object (such as a human), an accelerometer configured to obtain additional orientation data or other data indicative of an acceleration of the computing system 12 in a direction, a barometer configured to obtain relative pressure data indicative of the relative pressure in the environment, and/or a compass configured to obtain directional data indicative of a direction in which the computing system 12 is facing.

Sensors 40 may also include microphones or other transducers capable of detecting pressure waves representative of speech or other types of audio and outputting an electrical signal representative of the pressure waves (or changes thereof). Reference to microphones may include any type of microphone configured to obtain audio data, including bone-conducting microphones that sense vibrations in bone, flesh, or other materials.

Image capture device(s) 43 may represent any type of device configured to capture image data representative of a scene. Image capture device(s) 43 may sense light via an aperture and convert the detection of light into an electrical signal representative of color and luminance (and/or other representations of a color space). Image capture device(s) 43 may include a camera capable of capturing one or more images, including a sequence of images that form video data.

As such, input devices 40 may include software or hardware configured to convert a received signal input from an analog signal from sensors 40 and/or image capture devices 43 to a digital signal for processing by computation engine 22. In another example, input devices 40 may include software or hardware configured to compress, decompress, transcode, encrypt, or decrypt a received signal from sensors 40 into a form usable by computing system 12. In another example, communication units 25 may represent a network interface device to receive packetized data or other data representative of signals generated by sensor(s) 40 or images generated by image capture device(s) 43.

As noted above, computation engine 22 is configured to execute AI engine 32 that operates according to one or more models, such as AI models 20. AI models 20 may include any number of different types of machine learning models, such as neural networks, deep neural networks, dense neural networks, and the like. Although described with respect to machine learning models, the techniques described in this disclosure are also applicable to other types of AI models, including rule-based models, finite state machines, and the like.

Machine learning may generally enable a computing system to analyze input data and identify an action to be performed or a result to be output responsive to the input data. Each machine learning model may be trained using training data that reflects likely input data. The training data may be labeled or unlabeled (meaning that the correct action to be taken based on a sample of training data is explicitly stated or not explicitly stated, respectively).

The training of the machine learning model may be guided (in that a designer, such as a computer programmer, may direct the training to guide the machine learning model to identify the correct action in view of the input data) or unguided (in that the machine learning model is not guided by a designer to identify the correct action in view of the input data). In some instances, the machine learning model is trained through a combination of labeled and unlabeled training data, a combination of guided and unguided training, or possibly combinations thereof. Examples of machine learning include nearest neighbor, naïve Bayes, decision trees, linear regression, support vector machines, neural networks, k-Means clustering, Q-learning, temporal difference, deep adversarial networks, evolutionary algorithms or other supervised, unsupervised, semi-supervised, or reinforcement learning algorithms to train one or more models.

Even when the machine learning model undergoes guided training with labeled training data (which may represent what might be considered the most directed training that should result in more expected actions compared to unguided training using unlabeled training data or various combinations thereof), there are limits to training the machine learning model as such training is not often exhaustive (in terms of fully sampling each feature of the space defined by the input data). In other words, there is limited training data that may not or may not fully address the wider variability of the input data. Further, a potential benefit of machine learning models is to avoid exhaustive and time-consuming comprehensive training but still produce a machine learning model that performs accurate action (which is another way of referring to a "decision") identification through limited sampled training. As such, resulting AI models 20 may operate erratically (selecting surprising or unforeseen actions) in the context of certain (possibly unforeseen or unlikely) input data for which there were only limited (or no) samples in the training data or for which training was not fully performed.

Given the complexity of AI model 20, it may be difficult to explain in detail a basis upon which AI model 20 identified the various actions, particularly when such actions appear to be erratic or unexpected. To illustrate, consider an example of AI model 20 that implements a neural network, which may include multiple layers of neural networks, each of which is trained using training data to identify an action. Attempting to explain how each neural network weighed each aspect of the input data to identify what may be considered an erratic action may entail significant analysis and understanding of the training data, the input data, or combinations thereof.

Attempting to explain any machine learning models may be difficult, but combinations of machine learning models acting with respect to images, sequences of images (e.g., videos), or other visual data depicting a scene may further complicate a process used to explain a result returned by the combinations of machine learning models. For example, consider a visual question answering (VQA) model that includes one or more machine learning algorithms configured to return an answer (which may also be referred to as a result) to a query regarding an underlying image. The VQA model may receive as inputs the underlying image and a query regarding the image (typically in the form of audio data representative of speech defining the query).

The VQA model may include two different types of neural networks, a BERT model to process the audio data representative of the query to parse the query and identify keywords (which may also be referred to as query features) and the image data to identify image features, and a convolutional neural network (CNN) to process the query features and image features to tag the image features of the image. The VQA model may process the keywords relative to the tags to identify the answer to the query. The complexity of the CNN (and to a lesser degree the BERT model) and how each layer of the CNN weights each portion of the image and applies corresponding tags may be considered an erratic action that may entail significant analysis and understanding of the training data, the input data (both the audio data and the image), or combinations thereof.

In accordance with various aspects of the techniques described in this disclosure, AI models 20 may be configured to provide error-based explanations for artificial intelligence behavior (such as visual question answering (VQA) behavior). Rather than simply provide an answer (in the example context of a VQA model), AI model 20 may also identify which aspects of an underlying image were difficult for AI model 20 to analyze (e.g., the image features or other parts of the image toward which the "attention" of AI model 20 was erroneously drawn) in order to provide the answer, thereby potentially providing an error-based explanation that enables a user of AI model 20 to evaluate a reason for the answer and assess confidence in AI model 20 or otherwise gain a better understanding of limitations of AI model 20.

In the below example, it is assumed that AI model 20 is a collection of AI models configured to perform VQA. This collection of AI models may be referred to as a VQA model and as such, AI model 20 may be referred to in this disclosure as "VQA model 20." Although described with respect to a VQA model, the techniques of this disclosure may be implemented with respect to any visual analysis of images by machine learning models to potentially improve confidence in the underlying AI models (such as machine learning models and other non-machine learning models, including the non-machine learning models listed above) and/or better delineate limitations of the AI models.

In operation, VQA model 20 may obtain image data (ID) 31 representative of an image and audio data (AD) 33 representative of a query. Input devices 24 may initially interact with sensor 40 (e.g., a microphone) to obtain AD 31 and image capture device 43 (e.g., a camera) to obtain ID 33. Input device 24 may store AD 31 and ID 33 to memory whereupon VQA model 20 may obtain the AD 31 and ID 33 from memory 30.

In some instances, the user may interface with input device 24 directly (via a graphical keyboard) or other non-audio interface to directly provide the query. AD 31 may therefore in some instances be any data representative of a query, such as a text query. However, for purposes of illustration it is assumed that the user entered the query as speech through voice-related interaction with computing system 12. Although not shown in the example of FIG. 1, AD 31 may undergo processing to convert AD 31 to text prior to processing by VQA model 20.

Moreover, computing system 12 may obtain ID 33 in a variety of different ways other than via image capture device 43. For example, computing system 12 may interface with memory 30 to retrieve a previously captured image (via image capture device 43 or via a different image capture device associated with a different device). Computing system 12 may, in some examples, interface with communication unit 25 to retrieve ID 33 from a network storage location (e.g., the Internet) or other repository of image data.

In addition, ID 33 is discussed as an example representative of any type of image, including sequences of images (such as video data), medical scans (which may be constructed based on other type of sensor readings—such as radiological sensors), light detection and ranging (LIDAR) data, or any other type of data capable of being depicted in two-dimensional arrays, three-dimensional arrays, and the like. As such, while described with respect to ID 33 being a single image, the techniques may be performed with respect to other types of ID 33, not all of which are visual images.

In any event, VQA model 20 may receive AD 31 representative of the query regarding ID 33. VQA model 20 may execute one or more AI models to analyze ID 33 in order to output the result to the query represented by AD 31. More information regarding VQA can be found in a paper by Agrawal, Aishwarya, et al., entitled "VQA: Visual Question Answering," dated 27 Oct. 2016.

In some examples, VQA model 20 may invoke a bidirectional encoder representation from transformation (BERT) model, a long-short term memory (LSTM) model, and/or other language processing model to parse the query represented by AD 31 to identify one or more query features (which may be referred to as keywords) and relationships between the query features. In the example of a BERT model, VQA model may also invoke the BERT model to extract image features from ID 33, where the BERT model may extract both query features and image features. The BERT model may extract each of the query features and image features as vectors having a number of different underlying features extracted from the query (obtained from AD 31) and ID 33.

VQA model 20 may utilize the BERT model or some other form of neural network to perform semantic parsing of the query to identify the meaning of the query in the form of query features. VQA model 20 may also invoke a convolutional neural network (CNN) to tag portions of ID 33 (where such portions may be referred to as image features) and process the tagged image features of ID 33 to correlate the query features with the tags assigned to each of the tagged image features of ID 33 in order to identify the result (which may be another way to refer to the answer to the query). In other words, VQA model 20 may invoke the CNN to analyze, based on the meaning expressed as query features, the one or more image features to obtain the result to the query.

However, rather than only output an answer or other result to the query specified in AD 31, VQA model 20 may be configured to, when analyzing ID 33 to output the result, identify which parts of an image were difficult for VQA model 20 to analyze (e.g., the parts of the image toward which the "attention" of VQA model 20 was erroneously drawn) in order to provide the result. In this way, VQA model 20 may provide an error-based explanation that enables a user of VQA model 20 to evaluate a reason for the result to assess confidence in VQA model 20 or otherwise gain a better understanding of limitations of VQA model 20.

In operation, VQA model 20 may process ID 33 to assign an error score to each of the one or more image features extracted from ID 33, where each error score is indicative of a likelihood VQA model 20 had difficulty in analyzing the one or more image features extracted from ID 33. VQA model 20 may obtain, based on the error scores, an error map (which may also be referred to as an error mask). For example, VQA model 20 may apply gradient-weighted class activation mapping (Grad-CAM) to the image features in order to formulate the error map, which maps the error scores according to a gradient across the image features in the pixel domain. More information regarding Grad-CAM can be found in a paper by Selvaraju, R. et al., entitled "Grad-CAM: Visual Explanations from Deep Networks via Gradient-based Localization," and dated Oct. 7, 2016.

VQA model 20 may update, based on the error map and to obtain a first updated image, ID 33 to visually identify which of the one or more image features extracted from ID 33 are difficult for VQA model 20 to analyze. That is, because VQA model 20 generates the error map in the pixel domain, VQA model 20 may overlay the error map on ID 33 (which also resides in the pixel domain) to obtain the first updated image. VQA model 20 may output this first updated image (e.g., via output device 26) such that the user of the VQA model 20 can identify where the analysis of ID 33 by VQA model 20 was difficult, and thereby potentially gain a better understanding of how VQA model 20 erred in analyzing ID 33 while also identifying issues for further development of VQA model 20.

While described with respect to the image features, VQA model 20 may also perform a similar error analysis with respect to the query features in order to identify aspects of the query that may have contributed to error in VQA model 20 arriving at the incorrect result. VQA model 20 may then generate a query error map in the text domain of the query represented by AD 31, and use this query error map to highlight words of the query that were difficult for VQA model 20 to analyze. VQA model 20 may, in other words, update the query to visually illustrate words or phrases of the query that were difficult for VQA model 20 to analyze. VQA model 20 may output this updated query for review by the user of VQA model 20, which again may potentially provide the user with a better understanding of how VQA model 20 erred in analyzing the query while also identifying issues for further development of VQA model 20.

In addition, VQA model 20 may process ID 33 to identify an attention score for each of the one or more image features extracted from ID 33 that represent a basis by which VQA model 20 reached the result to the query. VQA model 20 may next generate, based on the attention scores, an attention map. In some instances, VQA model 20 may apply a bidirectional encoder representations from transformers (BERT) algorithm in order to generate the attention scores and the attention map.

Similar to the error map, the attention map may be defined in the pixel domain such that VQA model 20 may update ID 33 to overlay the attention map over ID 33 so as to obtain a second update image in which the one or more image features extracted from ID 33 are visually identified as representing the basis by which VQA model 20 reached the result to the query. VQA model 20 may output the second updated image such that the user of VQA model 20 may potentially gain a better understanding of how VQA model 20 analyzed ID 33 while also identifying issues for further development of VQA model 20. More information regarding attention-based explanations of VQA model 20 and other artificial intelligence models can be found in U.S. Pat. No. 10,909,401, by Burachas, G. et al., entitled "ATTENTION-BASED EXPLANATIONS FOR ARTIFICIAL INTELLIGENCE BEHAVIOR," with an effective filing date of May 24, 2019.

VQA model 20 may further generate a so-called helpfulness metric based on the error map and the attention map (and/or possibly via the underlying error scores and attention scores). This helpfulness metric may synthesize both of the error map and the attention map to assign an overall score to the performance of VQA model 20 in a manner that resemble how humans evaluate error maps and attention maps when deciding whether VQA model 20 is correct or incorrect.

VQA model 20 may generate the helpfulness metric as a negative correlation between the error map and the attention map. In other words, when the error map significantly overlaps the attention map (e.g., above some threshold), VQA model 20 is basing the result (which is likely incorrect) on a portion of ID 33 that was difficult for VQA model 20 to analyze. When the error map does not significantly overlap the attention map (e.g., below some threshold), VQA model 20 may base the result (which is likely correct) on a portion of ID 33 that was not difficult for the VQA model 20 to analyze. In either instance, VQA model 20 may generate the helpfulness metric to better explain how the result was reached by VQA model 20.

In this respect, various aspects of the techniques may provide various benefits that improve operation of VQA model 20 itself. For example, by outputting the error-based explanation (e.g., the update image) along with the answer, VQA model 20 may better explain the answer to provide a more comprehensive user experience that facilitates user trust and understanding. Further, by revealing limitations (e.g., when the explanation provided by the first updated image having an error map that shows that the subject of the query was difficult for VQA model 20 to analyze), VQA model 20 may delineate where further training may be useful to improve operation of VQA model 20 itself (where, in some instances, VAQ model 20 may automatically perform unguided training responsive to user feedback indicating a given answer is unsupported by the error-based explanation).

Moreover, by synthesizing the error map with the attention map to generate the helpfulness metric, VQA model 20 may even offer an even deeper explanation that resembles how humans evaluate error maps and attention maps. This deeper explanation in the form of the helpfulness metric may allow for an even more comprehensive user experience that facilitates trust and understanding, while also revealing additional limitations of the VQA model 20 that may form the basis for additional training (or even unguided automated training). The helpfulness metric may also be used to analyze different types of VQA models for deciding which VQA model should be used for a given context, situation, etc.

Although shown as being implemented by a single computing device, i.e., computing device 12 in the example of FIG. 1A, various other computing architectures may be employed to perform various aspects of the techniques described in this disclosure. In the example of FIG. 1B, a computing architecture is shown that includes a similar computing device 12 that may be coupled to a backend server 150 or other execution environment (such as virtual machines, etc.) via network 152. In this instance, aspects of the techniques may be implemented solely by computing system 12 (as discussed above with respect to the example of FIG. 1A) or implemented solely by backend server 150 (which may include similar components to computing device 12 discussed above with respect to the example of FIG. 1A).

In some instances, backend server 150 may implement various aspects of the techniques (such as the image/query processing) while other aspects may be performed by computing device 12 (such as obtaining AD 31 and ID 33 and outputting the result along with the explanations) in a distributed computing architecture. In this distributed architecture, computing system 12 may represent a so-called edge-device that communicates with backend server 150 to offload processing intensive tasks (e.g., to conserve battery power, facilitate faster execution of the processing intensive tasks, etc.). Backend server 150 may represent, in some instances, a server cluster that utilizes two or more servers in a distributed fashion to facilitate scaling of processing across multiple servers.

While described with respect to VQA and VQA models, various aspects of the techniques may be performed with respect to other type of AI models. As such, the techniques should not be strictly limited to VQA but may apply to other AI models, including deep-learning-based AI models.

Figure 2:
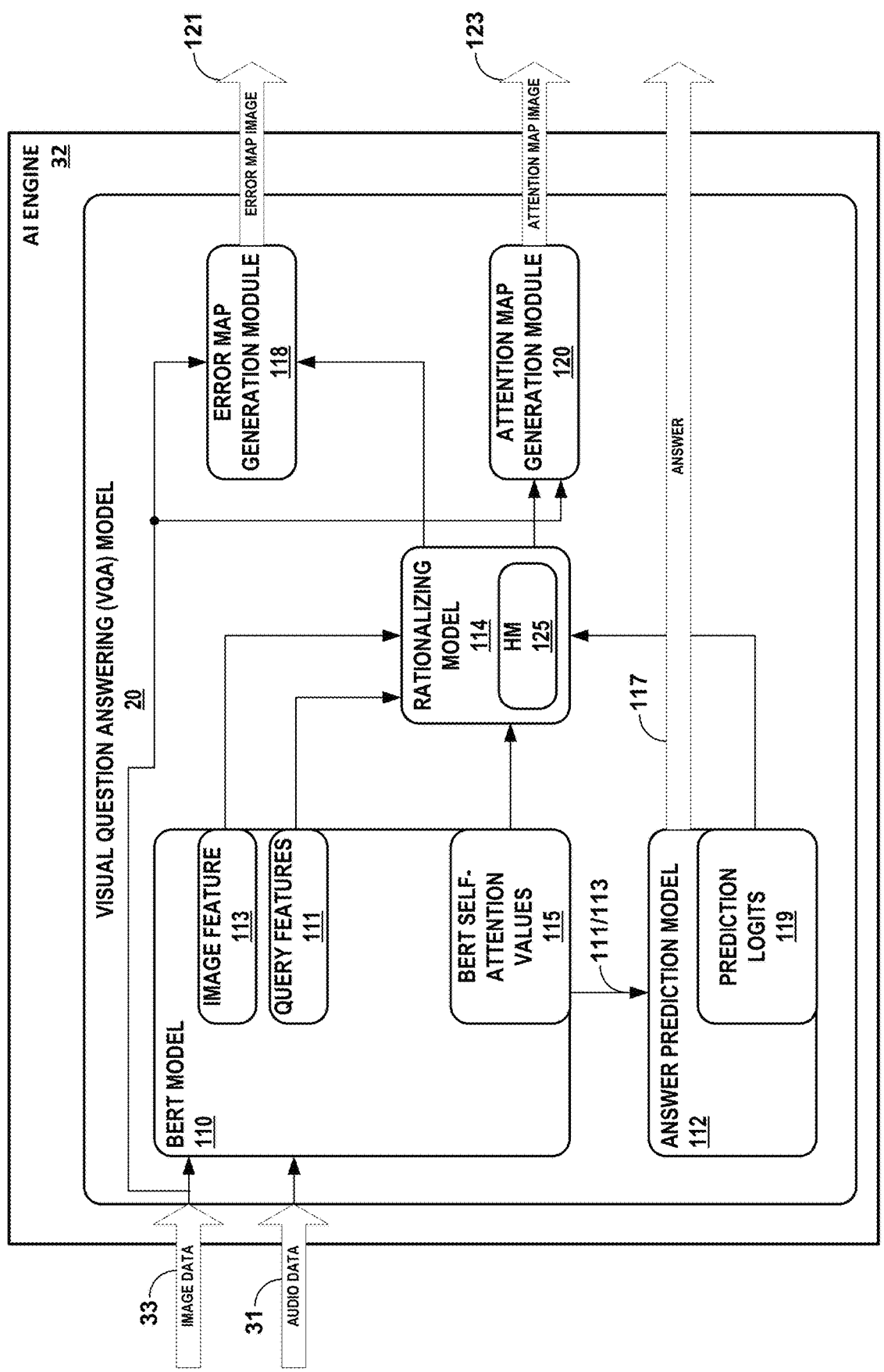
FIG. 2 is a block diagram illustrating an example of the artificial intelligence engine that implements visual question answering model of FIG. 1 in more detail.

FIG. 2 is a block diagram illustrating an example of the artificial intelligence engine of FIG. 1 in more detail. As shown in the example of FIG. 2, artificial intelligence (AI) engine 32 may execute a visual question answering (VQA) model 20. VQA model 20 may include a BERT model 110, an answer prediction model 112, a rationalizing model 114, an error map generation module 118, and an attention map generation module 120.

BERT model 110 may represent an artificial intelligence model trained to extract, from audio data 31 (or some derivative thereof, such as a query parsed from audio data 31), query features 111 and, from image data 33, image features 113, and. BERT model 110 may have N layers with N heads with various dimensions that is trained (e.g., via machine learning) to extract query features 111 from audio data 31 and image features 113 from image data 33. BERT model 110 may output query features 111 and image features 113 to answer prediction model 112 as query-image feature pairs.

BERT model 110 may also determine, via processing of the query and image data 31, BERT self-attention values 115 for each layer and head of BERT model 110. BERT self-attention values 115 may denote the outputs of each layer and head of the N layer by N head BERT model 110. BERT model 110 may output BERT self-attention values 115 to rationalizing model 114.

Answer prediction model 112 may represent a CNN or other machine learning model trained to (or, in other words, configured to) process the query-image feature pairs (denoted as QI features 111/113) to generate answer 117 (which may also be referred to as result 117). In determining answer 117, answer prediction model 112 may weight a number of different prediction logits 119, which may represent different tags capable of being associated with image features 113.

To illustrate, consider image data 33 depicting a vehicle with the query asking "what kind of truck is this?" Answer prediction model 112 may receive a number of different image features 113 mapped to the query feature defining "truck" that are then processed to weight prediction logits 119 defining "None," "Pickup," "Bus," etc. Answer prediction model 112 may output answer 117 as the highest weighted one of prediction logits 119. Answer prediction model 112 may also output these prediction logits 119 to rationalizing model 114.

Rationalizing model 114 may be a machine learning model trained to predict the performance of VQA model 20 and to identify evidence of difficulty in analyzing image data 33. Rationalizing model 114 may receive query features 111, image features 113, BERT self-attention values 115, and prediction logits 119. Rationalizing model 114 may process query features 111, image features 113, BERT self-attention values 115, and prediction logits 119 to assess the performance of VQA model 20, outputting a binary probability for failure (where, e.g., an output of one—1—occurs when VQA model 20 fails to provide the correct result). VQA model 20 may output this binary probability of failure as either a "VQA fail" prediction class or a "VQA succeeded" prediction class to error map generation module 118.

Rationalizing model 114 may also determine, based on BERT self-attention values 115 and prediction logits 119, attention scores for one or more of image features 113. These attention score represent areas of image data 33 that BERT model 110 referenced when generating image features 113 and that led prediction model 112 to identify result 117.

Rationalizing model 114 may compute the helpfulness in terms of a relevance of the attention scores for each layer of BERT model 110 (where such attention scores are defined by the BERT self-attention values 115). Rationalizing model 114 may compute a correlation-based helpfulness metric that computes a relevance for the analysis by VQA model 20 and then performs a correlation (such as Pearson correlation) between the accuracy of VQA model 20 and the computed relevance of each analysis by VQA model 20. Rationalizing model 114 may also compute a z-test-based helpfulness metric as a function of the relevance for correct analysis by VQA model 20 and the relevance for incorrect analysis by VQA model 20.

Rationalizing model 114 may select BERT self-attention values 115 for the layer of BERT model 110 with the best helpfulness metric (e.g., the correlation-based helpfulness metric, the z-test-based helpfulness metric, or some combination of the correlation-based helpfulness metric and the z-test-based helpfulness metric) as the attention scores for the given QI features 111/113. In some instances, rationalizing model 114 may average BERT self-attention values 115 over the layers for each head and/or for each layer over the heads, selecting the best average (for one or more of over the layers for each head and for each layer over the heads) from all of the computed averages and then sending BERT self-attention values 115 for the selected layers and heads associated with the best average of corresponding BERT self-attention values 115. Rationalizing model 114 may output these selected attention scores (e.g., one or more of BERT self-attention values 115) for the best layer of BERT model to attention map generation module 120.

Error map generation module 118 may represent a module configured to perform Grad-CAM with respect to the prediction class. Grad-CAM may highlight regions in image data 33 and the query that contribute to the prediction class output by rationalizing module 114. Grad-CAM may effectively produce, based on the prediction class (which is representative of the error scores), the error map, which error map generation module 118 may overlay on image data 33 to generate error map image 121.

Attention map generation module 120 may represent a module configured to generate, based on the attention scores, the attention map, which attention map generation module 120 may then overlay on image data 33 to obtain attention map image 123. Error map generation module 118 may output the error map image 121 for review by the user of VQA model 20, while attention map generation module 120 may output attention map image 123 for review by the user of VQA model 20.

Rationalizing model 114 may also determine overall helpfulness metric (HM) 125 based on the error map and the attention map. As noted above, rationalizing model 114 may determine HM 125 as an inverse correlation between the error map (or the underlying error scores) and the attention map (and/or the underlying attention scores). Rationalizing model 114 may also output HM 125 for review by the user of VQA model 20.

Figure 3B:
FIGS. 3A and 3B are diagrams illustrating two examples of the visual question answering model shown in the example of FIG. 2 in presenting error maps images along with attention map images in accordance with various aspects of the error-based explanation techniques described in this disclosure.
Figure 3B:
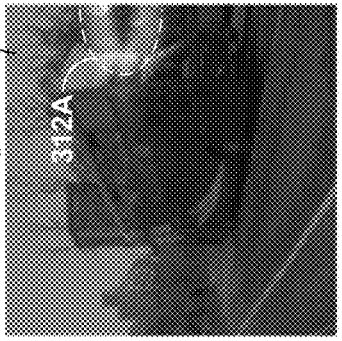
Figure 3B:
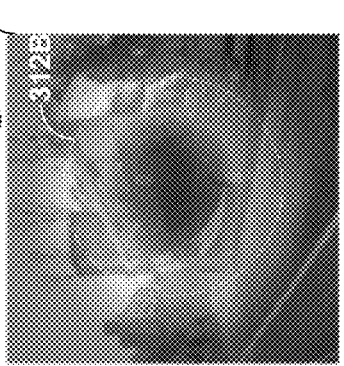
Figure 3B:
Figure 3A:
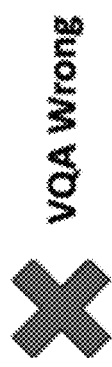
Figure 3A:
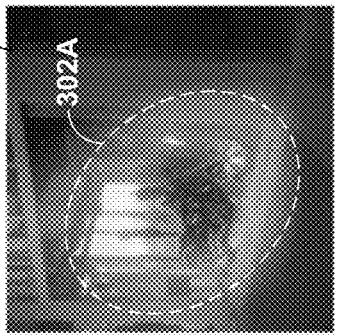
Figure 3A:
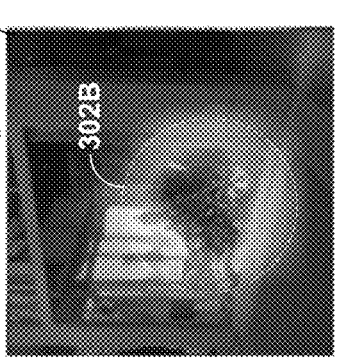
Figure 3A:

FIGS. 3A and 3B are diagrams illustrating two examples of the VQA model shown in the example of FIG. 2 in presenting error maps images along with attention map images in accordance with various aspects of the error-based explanation techniques described in this disclosure. Referring first to the example of FIG. 3A, VQA model 20 produces an error map image 300A and an attention map image 300B in the manner described above.

Error map image 300A includes an error region represented as an error heatmap 302A that uses color (as one example, where such color is shown in grayscale where darker gray maps to red and lighter gray maps to green with intermediate colors occurring along the gradient between red to green, including yellow and orange) to visually identify which of the one or more image features 113 are difficult for VQA model 20 to analyze. Similarly, attention map 300B includes an attention region represented as an attention heatmap 302B that uses color (as one example, where such color is shown in grayscale where darker gray maps to red and lighter gray maps to green with intermediate colors occurring along the gradient between red to green, including yellow and orange) to visually identify which of the one or more image features formed a basis upon which VQA model 20 reached result 117.

In the example of FIG. 3A, the query asks "Would it be easy to steal this motorcycle?" with ID 33 being a scene in which a motorcycle is shown in a showroom. VQA model 20 may process the query along with ID 33 in the manner described above to reach the result that "Yes," the motorcycle would be easy to steal. The ground truth (GT) is that ID 33 is depicting a showroom in which it would be ("No") difficult to steal the motorcycle depicting in ID 33. VQA model 20 may then output result 117 indicating "Yes" but also presents both error map image 300A and attention map image 300B, whereupon the user of VQA model 20 may note that error heatmap 302A significantly overlaps (or in other words, aligns) with attention heatmap 302B, meaning that a confidence of VQA model 20 in result 117 is low. In view of error heatmap 302A and attention heatmap 302A, the user of VQA model 20 may understand that trust in result 117 should be limited.

Referring next to the example of FIG. 3B, VQA model 20 produces an error map image 310A and an attention map image 310B in the manner described above. Error map image 310A includes an error region represented as an error heatmap 312A that uses color (which is shown in grayscale where darker gray maps to red and lighter gray maps to green with intermediate colors occurring along the gradient between red to green, including yellow and orange) to visually identify which of the one or more image features 113 are difficult for VQA model 20 to analyze. Similarly, attention map 310B includes an attention region represented as an attention heatmap 312B that uses color (which is shown in grayscale where darker gray maps to red and lighter gray maps to green with intermediate colors occurring along the gradient between red to green, including yellow and orange) to visually identify which of the one or more image features formed a basis upon which VQA model 20 reached result 117.

In the example of FIG. 3B, the query asks "Is this a double decker bus?" with ID 33 being a scene in which a double decker bus is shown in a common street scene. VQA model 20 may process the query along with ID 33 in the manner described above to reach the result that "Yes," the bus shown in ID 33 is a double decker bus. The ground truth (GT) is that ID 33 is depicting a double decker bus ("Yes"). VQA model 20 may then output result 117 indicating "Yes" but also presents both error map image 310A and attention map image 310B, whereupon the user of VQA model 20 may note that error heatmap 312A does not significantly overlap (or in other words, align) with attention heatmap 312B, meaning that a confidence of VQA model 20 in result 117 is high. In view of error heatmap 312A and attention heatmap 312A, the user of VQA model 20 may understand that trust in result 117 should be high.

Figure 4:
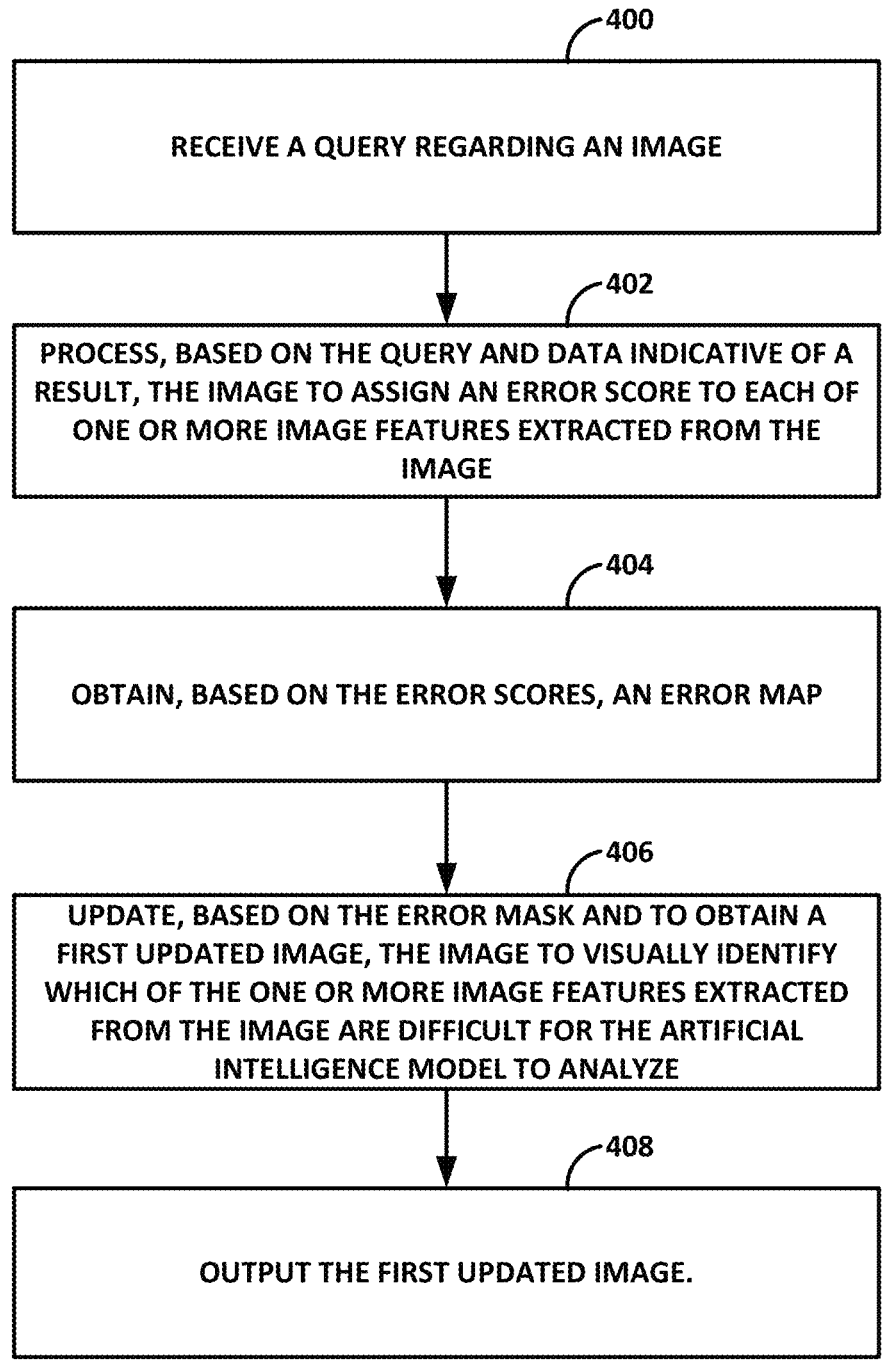
FIG. 4 is a flowchart illustrating example operation of the artificial intelligence engine of the computing system shown in FIG. 1 in performing various aspects of the error-based evaluation techniques described in this disclosure.

FIG. 4 is a flowchart illustrating example operation of the artificial intelligence engine of the computing system shown in FIG. 1 in performing various aspects of the evaluation techniques described in this disclosure. VQA model 20 may first receive a query (e.g., in the form of AD 31) regarding an image represented by ID 33 (400). VQA model 20 may next may process ID 33, based on the query and data indicative of a result (such as result 117 shown in the example of FIG. 2), to assign an error score to each of the one or more image features 113 extracted from ID 33, where each error score is indicative of a likelihood VQA model 20 had difficulty in analyzing the one or more image features extracted from ID 33 (402).

VQA model 20 may obtain, based on the error scores, an error map (404). For example, VQA model 20 may apply gradient-weighted class activation mapping (Grad-CAM) to the image features in order to formulate the error map, which maps the error scores according to a gradient across the image features in the pixel domain. VQA model 20 may update, based on the error map and to obtain a first updated image (e.g., error map image 121 shown in the example of FIG. 2), ID 33 to visually identify which of the one or more image features extracted from ID 33 are difficult for VQA model 20 to analyze (406). VQA model 20 may output this first updated image (e.g., via output device 26) (408) such that the user of the VQA model 20 can identify where the analysis of ID 33 by VQA model 20 was difficult, and thereby potentially gain a better understanding of how VQA model 20 erred in analyzing ID 33 while also identifying issues for further development of VQA model 20.

In addition, VQA model 20 may process ID 33 to identify an attention score for each of the one or more image features extracted from ID 33 that represent a basis by which VQA model 20 reached the result to the query. VQA model 20 may next generate, based on the attention scores, an attention map. In some instances, VQA model 20 may apply a bidirectional encoder representations from transformers (BERT) algorithm in order to generate the attention scores and the attention map.

Similar to the error map, the attention map may be defined in the pixel domain such that VQA model 20 may update ID 33 to overlay the attention map over ID 33 so as to obtain a second update image in which the one or more image features extracted from ID 33 are visually identified as representing the basis by which VQA model 20 reached the result to the query. VQA model 20 may output the second updated image such that the user of VQA model 20 may potentially gain a better understanding of how VQA model 20 analyzed ID 33 while also identifying issues for further development of VQA model 20. More information regarding attention-based explanations of VQA model 20 and other artificial intelligence models can be found in U.S. Pat. No. 10,909,401, by Burachas, G. et al., entitled "ATTENTION-BASED EXPLANATIONS FOR ARTIFICIAL INTELLIGENCE BEHAVIOR," with an effective filing date of May 24, 2019.

VQA model 20 may further generate a so-called helpfulness metric based on the error map and the attention map (and/or possibly via the underlying error scores and attention scores). This helpfulness metric may synthesize both of the error map and the attention map to assign an overall score to the performance of VQA model 20 in a manner that resemble how humans evaluate error maps and attention maps when deciding whether VQA model 20 is correct or incorrect.

VQA model 20 may generate the helpfulness metric as a negative correlation between the error map and the attention map. In other words, when the error map significantly overlaps the attention map (e.g., above some threshold), VQA model 20 is basing the result (which is likely incorrect) on a portion of ID 33 that was difficult for VQA model 20 to analyze. When the error map does not significantly overlap the attention map (e.g., below some threshold), VQA model 20 may base the result (which is likely correct) on a portion of ID 33 that was not difficult for the VQA model 20 to analyze. In either instance, VQA model 20 may generate the helpfulness metric to better explain how the result was reached by VQA model 20.

Figure 5:
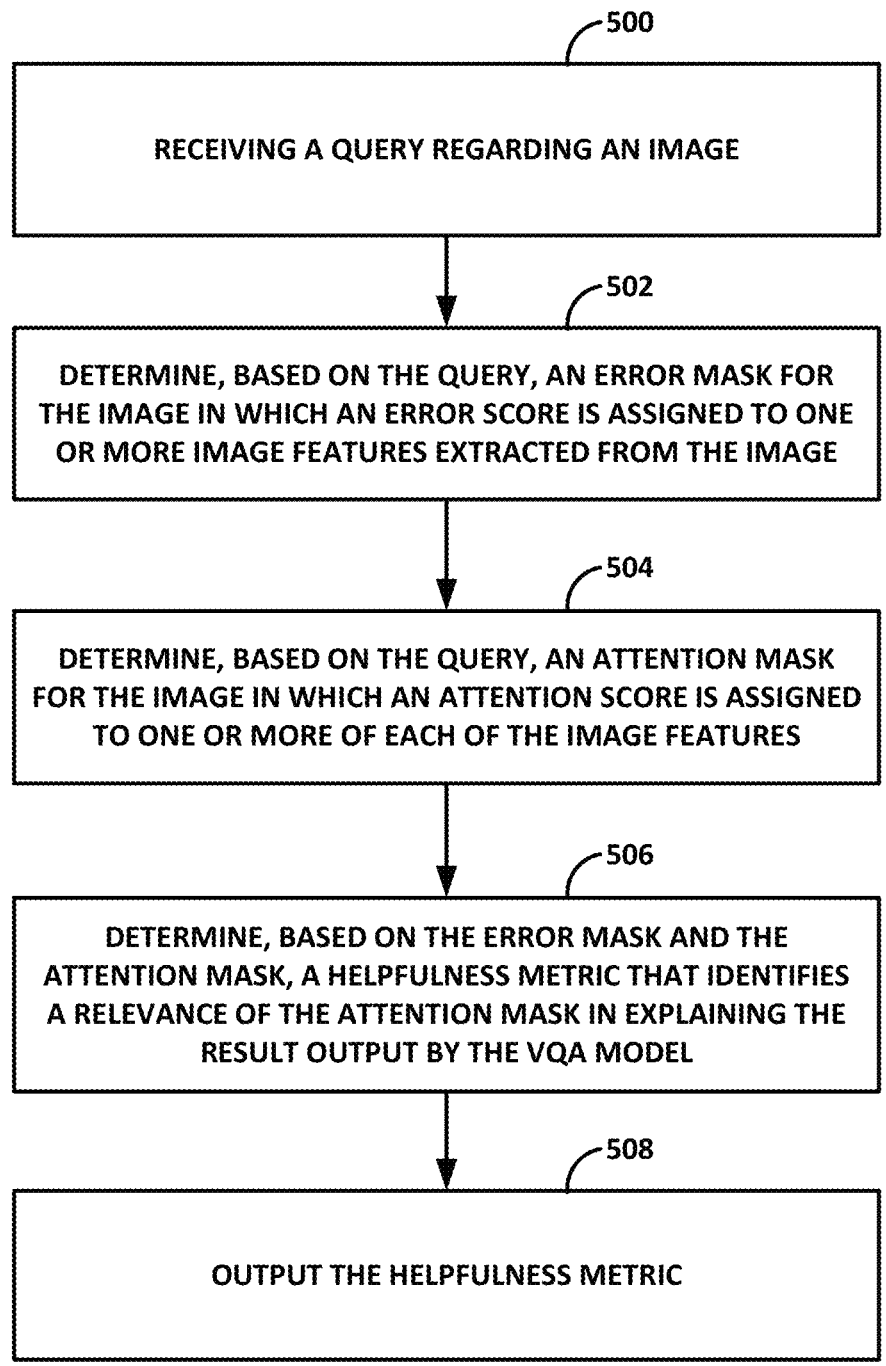
FIG. 5 is another flowchart illustrating further example operation of the artificial intelligence engine of the computing system shown in FIG. 1 in performing various aspects of the error-based evaluation techniques described in this disclosure.

FIG. 5 is another flowchart illustrating further example operation of the artificial intelligence engine of the computing system shown in FIG. 1 in performing various aspects of the error-based evaluation techniques described in this disclosure. VQA model may first receive a query (e.g., in the form of AD 31) regarding an image represented by ID 33 (500). VQA model 20 may next may process ID 33, based on the query, to assign an error score to each of the one or more image features 113 extracted from ID 33, where each error score is indicative of a difficulty of VQA model 20 in analyzing the one or more image features extracted from ID 33.

VQA model 20 may obtain, based on the query (in the form of the error scores), an error map for ID 33 in which an error score is assigned to one or more image features extracted form ID 33 (502). For example, VQA model 20 may apply gradient-weighted class activation mapping (Grad-CAM) to the image features in order to formulate the error map, which maps the error scores according to a gradient across the image features in the pixel domain.

In addition, VQA model 20 may process ID 33 to identify an attention score for each of the one or more image features extracted from ID 33 that represent a basis by which VQA model 20 reached the result to the query. VQA model 20 may next generate, based on the attention scores (derived in part form the query), an attention map in which an attention score is assigned to one or more of each of the image features (504). In some instances, VQA model 20 may apply a bidirectional encoder representations from transformers (BERT) algorithm in order to generate the attention scores and the attention map, as described above.

VQA model 20 may further generate, based on the error map and the attention map (and/or possibly via the underlying error scores and attention scores), a so-called helpfulness metric that identifies a relevance of the attention map in explaining result 117 (referring to the example of FIG. 2) output by VQA model 20 (506). This helpfulness metric may synthesize both of the error map and the attention map to assign an overall score to the performance of VQA model 20 in a manner that resemble how humans evaluate error maps and attention maps when deciding whether VQA model 20 is correct or incorrect.

VQA model 20 may generate the helpfulness metric as a negative correlation between the error map and the attention map. In other words, when the error map significantly overlaps the attention map (e.g., above some threshold), VQA model 20 is basing the result (which is likely incorrect) on a portion of ID 33 that was difficult for VQA model 20 to analyze. When the error map does not significantly overlap the attention map (e.g., below some threshold), VQA model 20 may base the result (which is likely correct) on a portion of ID 33 that was not difficult for the VQA model 20 to analyze. In either instance, VQA model 20 may generate the helpfulness metric to better explain how the result was reached by VQA model 20. VQA model 20 may thereby output helpfulness metric 125 (508) for review by the user of VQA model 20.

In this respect, various aspects of the techniques may enable the following examples.

Example 1. A computing system comprising: a memory configured to store an artificial intelligence model and the image; and a computation engine executing one or more processors, wherein the computation engine is configured to execute the artificial intelligence model to analyze the image to output a result, wherein the artificial intelligence model is configured to, when analyzing the image to output the result: process, based on data indicative of the result, the image to assign an error score to each of one or more image features extracted from the image, each of the error scores indicative of a likelihood the artificial intelligence model having difficulty in analyzing the corresponding image feature extracted from the image; obtain, based on the error scores, an error map; update, based on the error map and to obtain a first updated image, the image to visually indicate the error score assigned to each of the one or more image features; and output one or more of the error scores, the error map, and the first updated image.

Example 2. The computing system of example 1, wherein the artificial intelligence model is further configured to, when analyzing the image to output the result: process the image to identify an attention score for each of the one or more image features extracted from the image, each of the attention scores indicative of a basis by which the artificial intelligence model reached the result; and determine, based on the attention scores, an attention map.

Example 3. The computing system of example 2, wherein the artificial intelligence model is further configured to, when analyzing the image to output the result: update, based on the attention map and to obtain a second updated image, the image to visually indicate which of the one or more image features extracted from the image represent the basis by which the artificial intelligence model reached the result to the query; and output one or more of the attention scores, the attention map, and the second updated image.

Example 4. The computing system of any combination of examples 2 and 3, wherein the artificial intelligence model is further configured to, when analyzing the image to output the result: determine, based on the error map and the attention map, a helpfulness metric that identifies a relevance of the attention map in explaining the result output by the artificial intelligence model; and output the helpfulness metric.

Example 5. The computing system of example 4, wherein the artificial intelligence model is configured to determine the helpfulness metric as a negative correlation between the attention map and the error map.

Example 6. The computing system of any combination of examples 2-5, wherein the artificial intelligence model is configured to, when processing the image to identify the attention score, apply a bidirectional encoder representations from transformation model to identify the attention score for each of the one or more image features extracted from the image.

Example 7. The computing system of any combination of examples 1-6, wherein the artificial intelligence model is configured to, when determining the error map, apply a Gradient-weighted Class Activation Mapping model to process the image to assign the error score to each of the one or more image features extracted from the image and obtain, based on the error scores, the error map.

Example 8. The computing system of any combination of examples 1-7, wherein the artificial intelligence model is configured to: generate, based on the error map, a heatmap that uses color to visually indicate which of the one or more image features are difficult for the artificial intelligence model to analyze; and overlay the heatmap over the image to obtain the first updated image.

Example 9. The computing system of any combination of examples 1-8, wherein the computation engine is configured to receive a query regarding the image, and wherein the computation engine is configured to execute the artificial intelligence model to analyze the image to output the result to the query.

Example 10. A method of explaining a result output by an artificial intelligence model configured to analyze an image, the method comprising: executing, by a computing system, the artificial intelligence model to analyze the image in order to output a result, wherein analyzing, by the artificial intelligence model, the image to output the result comprises: processing, based on data indicative of the result, the image to assign an error score to each of one or more image features extracted from the image, each of the error scores indicative of the artificial intelligence model having difficulty in analyzing the corresponding image feature extracted from the image; obtaining, based on the error scores, an error map; updating, based on the error map and to obtain a first updated image, the image to visually indicate the error score assigned to each of the one or more image features; and outputting one or more of the error scores, the error map, and the first updated image.

Example 11. A device configured to explain a result output by an artificial intelligence model configured to analyze an image, the device comprising: a memory configured to store the artificial intelligence model and the image; and a computation engine executing one or more processors, wherein the computation engine is configured to execute the artificial intelligence model to analyze the image in order to output a result, wherein the artificial intelligence model is configured to, when analyzing the image to output the result: process the image to extract one or more image features; determine an error map for the image in which corresponding error scores are assigned to one or more of the image features; determine an attention map for the image in which corresponding attention scores are assigned to one or more of the image features; determine, based on the error map and the attention map, a helpfulness metric that identifies a relevance of the attention map in explaining the result output by the artificial intelligence model; and output one or more of the error scores, the error map, the attention scores, the attention map, and the helpfulness metric.

Example 12. The device of example 11, wherein the artificial intelligence model is further configured to: update, based on the error map and to obtain a first updated image, the image to visually indicate a likelihood the artificial intelligence model had difficulty when analyzing the one or more image features extracted from the image; and output the first updated image.

Example 13. The device of example 12, wherein the artificial intelligence model is configured to: generate, based on the error map, a first heatmap that uses color to visually indicate the likelihood the artificial intelligence model had difficulty when analyzing the one or more image features extracted from the image; and overlay the first heatmap over the image to obtain the first updated image.

Example 14. The device of any combination of examples 11-13, wherein the artificial intelligence model is further configured to: update, based on the attention map and to obtain a second updated image, the image to visually indicate which of the one or more image features formed a basis for the result output by the artificial intelligence model; and output the second updated image.

Example 15. The device of example 14, wherein the artificial intelligence model is configured to: generate, based on the attention map, a second heatmap that uses color to visually indicate which of the one or more image features form the basis by which the artificial intelligence model reached the result; and overlay the second heatmap over the image to obtain the second updated image.

Example 16. The device of any combination of examples 11-15, wherein the artificial intelligence model is configured to determine the helpfulness metric as a negative correlation between the attention map and the error map.

Example 17. The device of any combination of claims 11-16, wherein the computation engine is configured to receive a query regarding the image, and wherein the computation engine is configured to execute the artificial intelligence model to analyze the image to output the result to the query.

Example 18. A method of explaining a result output by an artificial intelligence model configured to analyze an image, the method comprising: receiving, by a computing system, a query regarding the image; and executing, by the computing system, the artificial intelligence model to analyze the image in order to output the result to the query, wherein analyzing, by the artificial intelligence model, the image to output the result: determining, based on the query, an error map for the image in which an error score is assigned to one or more image features extracted from the image; determining, based on the query, an attention map for the image in which an attention score is assigned to one or more of each of the image features; determining, based on the error map and the attention map, a helpfulness metric that identifies a relevance of the attention map in explaining the result output by the artificial intelligence model; and outputting the helpfulness metric.

Example 19. The method of example 18, further comprising: updating, based on the error map and to obtain a first updated image, the image to visually indicate a likelihood the artificial intelligence model had difficulty when analyzing the one or more image features extracted from the image; and outputting the first updated image.

Example 20. The method of example 19, wherein updating the image comprises: generating, based on the error map, a first heatmap that uses color to visually indicate the likelihood the artificial intelligence model had difficulty when analyzing the one or more image features extracted from the image; and overlaying the first heatmap over the image to obtain the first updated image.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A computing system comprising:
   a memory configured to store a trained artificial intelligence model and an image; and
   a computation engine executing one or more processors,
   wherein the computation engine is configured to execute the trained artificial intelligence model to analyze the image to output a result,
   wherein the trained artificial intelligence model is configured to, when analyzing the image to output the result:
   process, based on data indicative of the result, the image to assign an error score to each of one or more image features extracted from the image, each of the error scores indicative of a likelihood the trained artificial intelligence model is having difficulty in analyzing the corresponding image feature extracted from the image;
   obtain, based on the error scores, an error map;
   update, based on the error map and to obtain a first updated image, the image to visually indicate the error score assigned to each of the one or more image features; and
   output one or more of the error scores, the error map, and the first updated image.

2. The computing system of claim 1, wherein the trained artificial intelligence model is further configured to, when analyzing the image to output the result:
   process the image to identify an attention score for each of the one or more image features extracted from the image, each of the attention scores indicative of a basis by which the trained artificial intelligence model reached the result; and
   determine, based on the attention scores, an attention map.

3. The computing system of claim 2, wherein the trained artificial intelligence model is further configured to, when analyzing the image to output the result:
update, based on the attention map and to obtain a second updated image, the image to visually indicate which of the one or more image features extracted from the image represent the basis by which the trained artificial intelligence model reached the result to a query; and
output one or more of the attention scores, the attention map, and the second updated image.

4. The computing system of claim 2, wherein the trained artificial intelligence model is further configured to, when analyzing the image to output the result:
determine, based on the error map and the attention map, a helpfulness metric that identifies a relevance of the attention map in explaining the result output by the trained artificial intelligence model; and
output the helpfulness metric.

5. The computing system of claim 4, wherein the trained artificial intelligence model is configured to determine the helpfulness metric as a negative correlation between the attention map and the error map.

6. The computing system of claim 2, wherein the trained artificial intelligence model is configured to, when processing the image to identify the attention score, apply a transformer model to identify the attention score for each of the one or more image features extracted from the image.

7. The computing system of claim 1, wherein the trained artificial intelligence model is configured to, when determining the error map, apply a Gradient-weighted Class Activation Mapping model to process the image to assign the error score to each of the one or more image features extracted from the image and obtain, based on the error scores, the error map.

8. The computing system of claim 1, wherein the trained artificial intelligence model is configured to:
generate, based on the error map, a heatmap that visually indicates which of the one or more image features are difficult for the trained artificial intelligence model to analyze; and
overlay the heatmap over the image to obtain the first updated image.

9. The computing system of claim 1,
wherein the computation engine is configured to receive a query regarding the image,
wherein the computation engine is configured to execute the trained artificial intelligence model to analyze the image to output the result to the query, and
wherein each of the error scores comprises a respective error score that is indicative of the likelihood the trained artificial intelligence model having difficulty in analyzing the corresponding image feature extracted from the image to output the result to the query.

10. A method of explaining a result output by a trained artificial intelligence model configured to analyze an image, the method comprising:
executing, by a computing system, the trained artificial intelligence model to analyze the image in order to output a result,
wherein analyzing, by the trained artificial intelligence model, the image to output the result comprises:
processing, based on data indicative of the result, the image to assign an error score to each of one or more image features extracted from the image, each of the error scores indicative of the trained artificial intelligence model having difficulty in analyzing the corresponding image feature extracted from the image;
obtaining, based on the error scores, an error map;
updating, based on the error map and to obtain a first updated image, the image to visually indicate the error score assigned to each of the one or more image features; and
outputting one or more of the error scores, the error map, and the first updated image.

11. A device configured to explain a result output by a trained artificial intelligence model configured to analyze an image, the device comprising:
a memory configured to store the trained artificial intelligence model and the image; and
a computation engine executing one or more processors,
wherein the computation engine is configured to execute the trained artificial intelligence model to analyze the image in order to output a result,
wherein the trained artificial intelligence model is configured to, when analyzing the image to output the result:
process the image to extract one or more image features;
determine an error map for the image in which corresponding error scores are assigned to one or more of the image features;
determine an attention map for the image in which corresponding attention scores are assigned to one or more of the image features;
determine a helpfulness metric as a negative correlation between the attention map and the error map, wherein the helpfulness metrics identifies a relevance of the attention map in explaining the result output by the trained artificial intelligence model; and
output one or more of the error scores, the error map, the attention scores, the attention map, and the helpfulness metric.

12. The device of claim 11, wherein the trained artificial intelligence model is further configured to:
update, based on the error map and to obtain a first updated image, the image to visually indicate a likelihood the trained artificial intelligence model had difficulty when analyzing the one or more image features extracted from the image; and
output the first updated image.

13. The device of claim 12, wherein the trained artificial intelligence model is configured to:
generate, based on the error map, a first heatmap that visually indicates the likelihood the trained artificial intelligence model had difficulty when analyzing the one or more image features extracted from the image; and
overlay the first heatmap over the image to obtain the first updated image.

14. The device of claim 11, wherein the trained artificial intelligence model is further configured to:
update, based on the attention map and to obtain a second updated image, the image to visually indicate which of the one or more image features formed a basis for the result output by the trained artificial intelligence model; and
output the second updated image.

15. The device of claim 14, wherein the trained artificial intelligence model is configured to:
generate, based on the attention map, a second heatmap that visually indicates which of the one or more image features form the basis by which the trained artificial intelligence model reached the result; and
overlay the second heatmap over the image to obtain the second updated image.

16. The device of claim 11,
wherein the computation engine is configured to receive a query regarding the image,
wherein the computation engine is configured to execute the trained artificial intelligence model to analyze the image to output the result to the query, and
wherein each of the error scores comprises a respective error score that is indicative of a likelihood the trained artificial intelligence model is having difficulty in analyzing the corresponding image feature extracted from the image to output the result to the query.

17. A method of explaining a result output by a trained artificial intelligence model configured to analyze an image, the method comprising:
receiving, by a computing system, a query regarding the image; and
executing, by the computing system, the trained artificial intelligence model to analyze the image in order to output the result to the query,
wherein analyzing, by the trained artificial intelligence model, the image to output the result:
determining, based on the query, an error map for the image in which an error score is assigned to one or more image features extracted from the image;
determining, based on the query, an attention map for the image in which an attention score is assigned to one or more of each of the image features;
determining a helpfulness metric as a negative correlation between the attention map and the error map, wherein the helpfulness metric identifies a relevance of the attention map in explaining the result output by the trained artificial intelligence model; and
outputting the helpfulness metric.

18. The method of claim 17, further comprising:
updating, based on the error map and to obtain a first updated image, the image to visually indicate a likelihood the trained artificial intelligence model had difficulty when analyzing the one or more image features extracted from the image; and
outputting the first updated image.

19. The method of claim 18, wherein updating the image comprises:
generating, based on the error map, a first heatmap that visually indicates the likelihood the trained artificial intelligence model had difficulty when analyzing the one or more image features extracted from the image; and
overlaying the first heatmap over the image to obtain the first updated image.

* * * * *